(12) United States Patent
Endo et al.

(10) Patent No.: US 8,059,315 B2
(45) Date of Patent: Nov. 15, 2011

(54) IMAGE READING DEVICE

(75) Inventors: Takafumi Endo, Chiyoda-ku (JP); Yohei Nokami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 12/466,808

(22) Filed: May 15, 2009

(65) Prior Publication Data
US 2009/0310193 A1 Dec. 17, 2009

(30) Foreign Application Priority Data
Jun. 11, 2008 (JP) .................................. 2008-153094

(51) Int. Cl.
*H04N 1/04* (2006.01)
*G06K 7/10* (2006.01)

(52) U.S. Cl. ........................ 358/474; 358/484; 358/487
(58) Field of Classification Search .................. 358/471, 358/474, 475, 484, 487, 496
See application file for complete search history.

(56) References Cited

U.S. PATENT DOCUMENTS

| 5,523,876 A | 6/1996 | Tellam et al. |
| 7,088,477 B2 * | 8/2006 | Koshimizu et al. ........... 358/487 |
| 2002/0015145 A1 | 2/2002 | Numata |
| 2003/0072040 A1 | 4/2003 | Okamura |
| 2006/0187676 A1 | 8/2006 | Ishikura |
| 2007/0133858 A1 | 6/2007 | Endo et al. |
| 2007/0165286 A1 | 7/2007 | Endo et al. |
| 2007/0216976 A1 | 9/2007 | Endo et al. |
| 2008/0304121 A1 | 12/2008 | Endo et al. |
| 2009/0310192 A1 | 12/2009 | Endo et al. |

FOREIGN PATENT DOCUMENTS
CN    1332431 A    1/2002
(Continued)

OTHER PUBLICATIONS

Chinese Office Action issued Oct. 28, 2010, in Patent Application No. 200910145446.2 (with English-language translation).

(Continued)

*Primary Examiner* — Thomas D Lee
(74) *Attorney, Agent, or Firm* — Oblon, Spivak, McClelland, Maier & Neustadt, L.L.P.

(57) ABSTRACT

An image reading device having a compact plane-shaped illumination portion is provided, by which a portion of a target to be light-irradiated can be irradiated with light whose oblique angles are different from each other, and a transmission part of the target can be read. The image reading device includes a conveying means for conveying in a conveying direction a target to be light-irradiated including a transparent portion, a lens assembly, arranged on one side of the target, for focusing transmission light having passed through the transparent portion of the target, a sensor for receiving the transmission light focused by the lens assembly, a light source, positioned on the other side of the target, arranged in a main-scanning direction, and a light guide for guiding light from the light source in a sub-scanning direction, and the light guide having a reflective portion for reflecting the guided light and then irradiating a portion to be irradiated with the reflected light.

13 Claims, 21 Drawing Sheets

FOREIGN PATENT DOCUMENTS

| | | |
|---|---|---|
| EP | 1 164 553 A2 | 12/2001 |
| EP | 1 239 423 A2 | 9/2002 |
| EP | 1 818 876 A1 | 8/2007 |
| EP | 2 146 329 A2 | 1/2010 |
| JP | 7-7259 | 1/1995 |
| JP | 2000-113269 | 4/2000 |
| JP | 2001-357429 | 12/2001 |
| JP | 2002-260051 | 9/2002 |
| JP | 2003-87564 | 3/2003 |
| JP | 2005-5275 | 1/2005 |
| JP | 2007-87757 | 4/2007 |
| JP | 2007-194797 | 8/2007 |

OTHER PUBLICATIONS

U.S. Appl. No. 12/466,761, filed May 15, 2009, Endo, et al.

* cited by examiner ively small number of LEDs in
IMAGE READING DEVICE

BACKGROUND OF THE INVENTION

1. Field of the Invention

The present invention relates to image reading devices used for reading out image data in a light-transparent portion of a target to be light-irradiated such as banknotes.

2. Description of the Related Art

As such conventional image reading device, for example, a device has been disclosed in FIG. 1 of Japanese Patent Application Publication Laid-Open No. 2000-113269 (referred to as Patent Document 1). That is, in Patent document 1, a banknote identification apparatus is disclosed in which light is incident on a watermarked image of a banknote, etc., the light that has passed therethrough is detected by an artificial retina chip, information on the image shape, etc. of the transparent portion (hereinafter also referred to as watermarked portion) and on whether the image is present or not therein is processed by a knowledge processing circuit, and thus the banknote, etc. is authenticated.

An image reading device is disclosed in FIG. 2 of Japanese Patent Application Publication Laid-Open No. 2003-87564 (referred to as Patent Document 2), in which both transmission-type and reflection-type image readers are used. The image reading device disclosed is configured in such a way that a light source for a transparent document is installed in a document cover, a document mat is attachably and detachably engaged to the document cover, and thus when a light-reflective document is read, the document mat is attached to the document cover, while, when a transparent document is read, the document mat is detached from the document cover.

An illumination device and an image reading device using the same are disclosed in FIG. 8 of Japanese Utility Model Application Laid-Open No. 1995-7259 (referred to as Patent Document 3), in which light incident inside a transparent rod 21 through one of end faces 21a and 21b thereof is repeatedly total-reflected by outer peripheral surfaces of the transparent rod 21, and, while traveling toward the other end face 21a or 21b, the light is scattered by a light diffusion face 31 formed on one of the outer peripheral surfaces and exits from a face 21c opposite to the face 31, whereby a uniform illuminance level can be obtained in the main-scanning direction X.

An image reading device is disclosed in FIG. 1 of Japanese Patent Application Publication Laid-Open No. 2007-194797 (referred to as Patent Document 4), in which image data in a transparent portion of a target to be light-irradiated can be read out by disposing light sources on one side of the target, tilted at a predetermined angle with respect to a plane perpendicular to the target, and receiving light emitted from the light sources and scattered by the roughness of the transparent portion of the target.

In the banknote identification apparatus disclosed in Patent Document 1, when the identification is performed with respect to the watermarked portion of the banknote, etc., after so-called direct light from the light source has been transmitted through the watermarked portion of the banknote, etc., the transmitted light is converted into electrical signals, and thus the image in the watermarked portion of the banknote, etc. is read out.

The image reading device disclosed in Patent Document 2 can also be considered that so-called a transmission-type image reading device (hereinafter, also referred simply to as "transmission-type device") and a reflection-type image reading device (hereinafter, also referred simply to as "reflection-type device") are combined; however, also in this system, when the image in the light transparent portion is read out by the transmission-type device, the reading is performed by using so-called direct light.

In the image reading device disclosed in Patent Document 3, because, by arranging a relatively small number of LEDs in a sub-scanning direction, light emitted therefrom is guided in a main-scanning direction, and gradually emitted from the light diffusion face so that its distribution becomes uniform, the illuminance is insufficient so that the device cannot be suitably used for high-speed reading such as reading when a document moving in high speed, which has been a problem.

Moreover, the image reading device disclosed in Patent Document 4 is configured in such a way that, by using horn-shaped light guides 22 for guiding light emitted from transmission-type light sources 21, light emitted at a predetermined angle from light exit portion 22a of the horn-shaped light guides 22 is incident on a portion 5, to be light irradiated, along a conveying path of a document 1; therefore, a problem has occurred that, because its light-guide path between the transmission-type light sources 21 to the light-irradiation portion 5 is relatively long, and its size in a direction perpendicular to the conveying direction of transmission-type light-source assembly 20 is large, the device is unsuitable to be miniaturized, and irradiation can only be performed with a single predetermined angle.

SUMMARY OF THE INVENTION

An objective of the present invention, which is made to solve the above described problem, is to provide an image reading device for reading a transmission part of a target to be light-irradiated, having a compact plane-shaped illumination portion, by which a portion of the target can be irradiated with light whose oblique angle is variable.

According to a first aspect of the present invention, an image reading device includes a conveying means for conveying in a conveying direction a target to be light-irradiated including a transparent portion; a lens assembly, arranged on one side of the target, for focusing transmission light having passed through the transparent portion of the target; a sensor for receiving the transmission light focused by the lens assembly; a light source, positioned on the other side of the target, arranged in a main-scanning direction; and a light guide for guiding light from the light source in a sub-scanning direction, and the light guide having a reflective portion for reflecting the guided light and then irradiating a portion to be irradiated with the reflected light.

According to a second aspect of the present invention, an image reading device as recited in the first aspect, wherein the reflective portion of the light guide tilts the light emitted from the light source with respect to the optical axis of an imaging optical system as the lens assembly so as to irradiate the target.

According to a third aspect of the present invention, an image reading device as recited in the first aspect, wherein reflective material is provided on the surface of the reflective portion of the light guide.

According to a fourth aspect of the present invention, an image reading device as recited in the second aspect, wherein reflective material is provided on the surface of the reflective portion of the light guide.

According to a fifth aspect of the present invention, an image reading device includes a conveying means for conveying in a conveying direction a target to be light-irradiated including a transparent portion; a lens assembly, arranged on one side of the target, for focusing transmission light having passed through the transparent portion of the target; a sensor for receiving the transmission light focused by the lens assembly; a first light source, positioned on the other side of the target, arranged in a main-scanning direction on a plane perpendicular to the conveying direction; a second light source arranged, in parallel to the first-light-source arrangement, on the same plane on which the first light source is provided, or in the periphery thereof a light guide for guiding light from the first and second light sources in a sub-scanning direction, and the light guide, having a plurality of reflective portions whose light-irradiation angles are different from each other, for reflecting the guided light and then irradiating a portion, of the target, to be irradiated with the reflected light; and a lighting control means for controlling in time division an exposure ratio of the quantities of light incident on the reflective portions of the light guide; and the sensor detecting electrical signals time-divided by the lighting control means.

According to a sixth aspect of the present invention, an image reading device as recited in the fifth aspect, wherein the reflective portions of the light guide tilts the light emitted from the first or the second light source with respect to the optical axis of the lens assembly as an imaging optical system so as to irradiate the target.

According to a seventh aspect of the present invention, an image reading device as recited in the fifth aspect, wherein reflective material is provided on a part of the surfaces of the reflective portions of the light guide.

According to an eighth aspect of the present invention, an image reading device as recited in the sixth aspect, wherein reflective material is provided on a part of the surfaces of the reflective portions of the light guide.

According to a ninth aspect of the present invention, an image reading device includes a conveying means for conveying in a conveying direction a target to be light-irradiated including a transparent portion; a first light source arranged in a main-scanning direction on a plane perpendicular to the conveying direction; a second light source arranged, in parallel to the first-light-source arrangement, on the same plane on which the first light source is provided, or in the periphery thereof a third light source, plane-symmetrically placed to face the first light source, for emitting light, whose spectrum is identical to that of the first light source, in the direction opposite to that of the first light source; a fourth light source, plane-symmetrically placed to face the second light source, for emitting light, whose spectrum is identical to that of the second light source, in the direction opposite to that of the second light source; a light guide for guiding light from the first to fourth light sources in a sub-scanning direction, and the light guide, having a plurality of reflective portions for reflecting the guided light and then irradiating a portion, of the target, to be irradiated with the reflected light; and a lighting control means for controlling in time division an exposure ratio of the quantities of light incident on the reflective portions of the light guide; a lens assembly for focusing transmission light having passed through the transparent portion of the target positioned at the portion to be light-irradiated; and a sensor for receiving for each divided time the transmission light focused by the lens assembly; and the plurality of reflective portions irradiating the portion to be irradiated with light guided from the first and third light sources and that from the second and fourth light sources at light-irradiation angles different from each other.

According to a tenth aspect of the present invention, an image reading device as recited in the ninth aspect, wherein the reflective portions of the light guide tilts the light emitted from the first or the second light source with respect to the optical axis of the lens assembly as an imaging optical system so as to irradiate the target.

According to an eleventh aspect of the present invention, an image reading device as recited in the ninth aspect, wherein reflective material is provided on a part of the surfaces of the reflective portions of the light guide.

According to a twelfth aspect of the present invention, an image reading device as recited in the tenth aspect, wherein reflective material is provided on a part of the surfaces of the reflective portions of the light guide.

According to a thirteenth aspect of the present invention, an image reading device includes a conveying means for conveying in a conveying direction a target to be light-irradiated including a transparent portion; a first light source, arranged in a main-scanning direction on a plane perpendicular to the conveying direction, for emitting light having a plurality of wavelengths; a second light source, arranged, in parallel to the first-light-source arrangement, on the same plane on which the first light source is provided, or in the periphery thereof, for emitting light having a plurality of wavelengths; a light guide for guiding light from the first and second light sources in a sub-scanning direction, and the light guide, having reflective portions whose light-irradiation angles are different from each other, for reflecting the guided light and then irradiating a portion, of the target, to be irradiated with the reflected light; a lighting control means for selecting and controlling an exposure ratio of the quantities of light incident on the reflective portions of the light guide; a lens assembly for focusing transmission light having passed through the transparent portion of the target; and a sensor for receiving the transmission light focused by the lens assembly; and the sensor detecting by switching electrical signals with respect to the transmission light from the portion, of the target, to be irradiated with light having light-irradiation angles different from each other.

According to a fourteenth aspect of the present invention, an image reading device includes a conveying means for conveying in a conveying direction banknote including a watermark portion; a first light source, arranged in a main-scanning direction on a plane perpendicular to the conveying direction, for emitting light; a second light source, arranged, in parallel to the first-light-source arrangement, on the same plane on which the first light source is provided, or in the periphery thereof, for emitting light; a light guide for guiding light from the first and second light sources in a sub-scanning direction, and the light guide, having reflective portions whose light-irradiation angles are different from each other, for reflecting the guided light and then irradiating a portion, of the banknote, to be irradiated with the reflected light; a lighting control means for controlling in time division an exposure ratio of the quantities of light incident on the reflective portions of the light guide; and a sensor for receiving, for each divided time, transmission light having passed through the watermark portion; and the sensor detecting electrical signals with respect to the transmission light from the portion irradiated with light having light-irradiation angles different from each other, so that the banknote is determined to be real or counterfeit.

According to a fifteenth aspect of the present invention, an image reading device includes a conveying means for conveying in a conveying direction a target to be light-irradiated including a transparent hologram region; a first light source, arranged in a main-scanning direction on a plane perpendicular to the conveying direction, for emitting light having a plurality of wavelengths; a second light source, arranged, in parallel to the first-light-source arrangement, on the same plane on which the first light source is provided, or in the periphery thereof, for emitting light having a plurality of wavelengths; a light guide for guiding light from the first and second light sources in a sub-scanning direction, and the light guide, having reflective portions whose light-irradiation angles are different from each other, for reflecting the guided light and then irradiating a portion, of the hologram region, to be irradiated with the reflected light; a lighting control means for controlling in time division an exposure ratio of the quantities of light incident on the reflective portions of the light guide; and a sensor for receiving, for each divided time, transmission light having passed through the hologram region; and the sensor detecting electrical signals with respect to the transmission light from the hologram region, of the target, irradiated with light having light-irradiation angles different from each other.

DETAILED DESCRIPTION OF THE PREFERRED EMBODIMENTS

Embodiment 1

Figure 1:
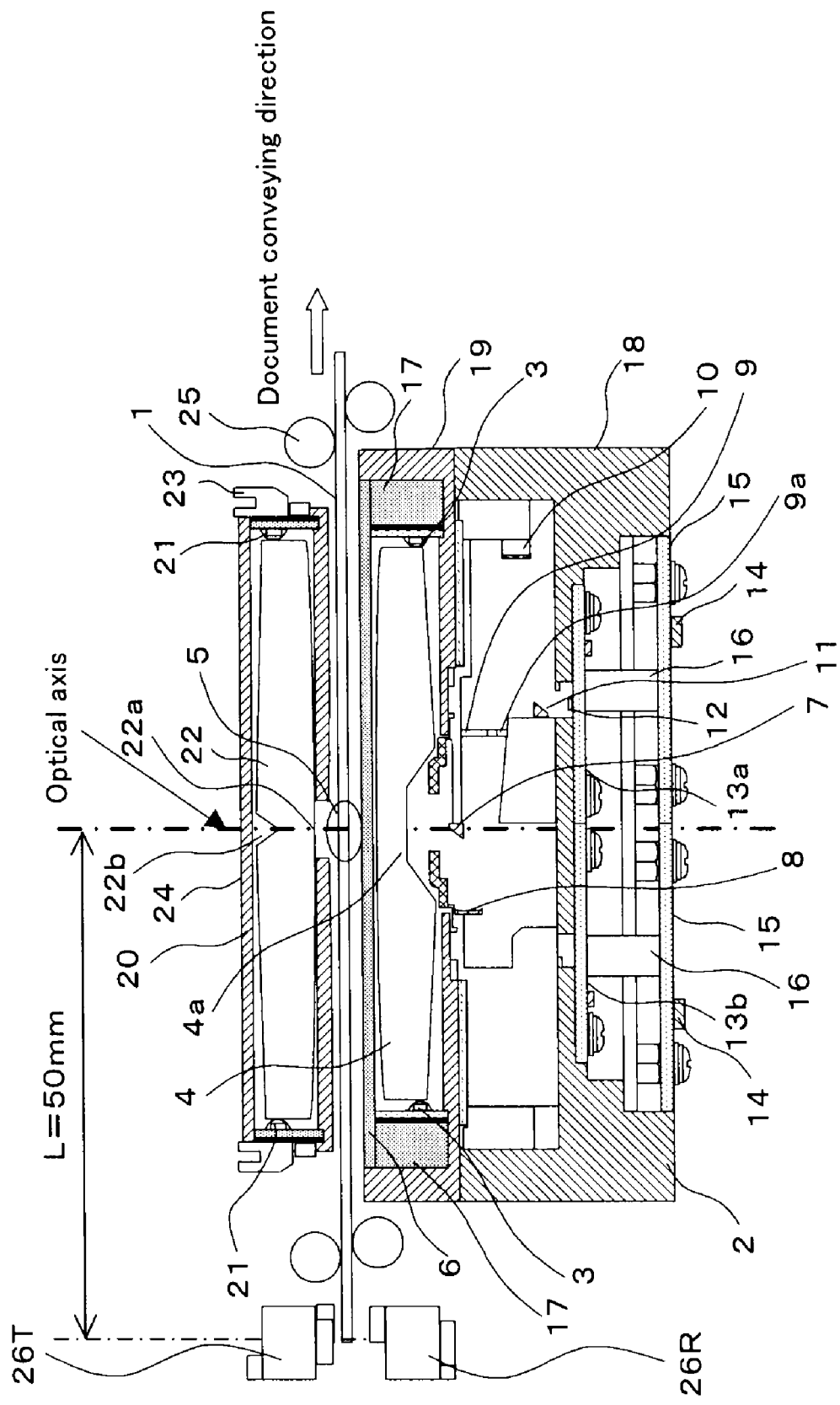
FIG. 1 is a cross-sectional configuration view illustrating an image reading device according to Embodiment 1 of the present invention.

Hereinafter, Embodiment 1 according to the present invention is explained using FIG. 1. FIG. 1 is a cross-sectional configuration view illustrating an image reading device according to Embodiment 1. In FIG. 1, numeral 1 denotes a target to be light-irradiated, such as a banknote, securities or a check, and film (hereinafter, simply referred to as a document or a banknote), which includes a semi-transparent or transparent watermarked portion (hereinafter, also referred to as a transparent portion), and a reflective portion through which little light passes.

Numeral 2 denotes a contact image sensor (hereinafter, simply referred to as "CIS") arranged on one side of the document 1 (lower side in FIG. 1). Numeral 3 denotes reflection-type light sources arranged on both sides of a CIS 2, which are arranged on one side of the document 1, and configured of LED chips being straightly arranged in an array manner along the width direction of the document 1 (main-scanning direction). Numeral 4 denotes a reflection-type light guide, made of transparent material such as polycarbonate resin or soda glass, by which light emitted from the reflection-type light sources 3 is guided in sub-scanning directions, and the reflection-type light guide includes a light exit portion 4a. Numeral 5 denotes a portion to be light-irradiated, being a straight portion along the main-scanning direction, in which light emitted from the reflection-type light sources 3 is incident on the document 1 placed along its conveying path, and the portion means a reading portion of the document 1 conveyed.

Numeral 6 denotes a transparent member, whose thickness is approximately 2.5 mm, formed of transparent plastic material having a function for preventing contaminant intrusion, etc. into the CIS 2, where the document 1 is conveyed outside the transparent member 6 so as to be guided. Numeral 7 denotes a first mirror for reflecting in a sub-scanning direction reflection light that has been emitted from the reflection-type light sources 3 and reflected by one of the faces of the document 1; numeral 8 denotes a concave first lens mirror for receiving the reflection light from the first mirror 7 (also referred to as a first lens, or a first aspherical mirror); numeral 9 denotes an aperture for receiving parallel light from the first lens 8; numeral 9a denotes an opening, provided on the surface of the aperture 9 or in the vicinity thereof, for reducing chromatic aberration of light passing through the aperture 9; numeral 10 denotes a concave second lens mirror for receiving light passing through the aperture 9 (also referred to as a second lens or a second-aspherical mirror); and numeral 11 denotes a second mirror for receiving light from the second lens 10, and for reflecting it.

Numeral 12 denotes MOS-semiconductor sensor ICs (also referred to as sensors) each including an photoelectric conversion circuit that receives through the second mirror 11 light that has passed through the opening 9a and been reflected by the second lens 10 to convert the light into an electrical signal, and including its driving circuit; and numeral 13 denotes sensor boards on which the sensor ICs 12 are mounted, which are composed of a first sensor board 13a and a second sensor board 13b. Numeral 14 denotes signal processing ICs (ASICs: application specific integrated circuits) for processing the signal obtained after the photoelectric conversion by the sensor ICs 12; numeral 15 denotes signal-processing boards on which the ASICs 14 or the like are mounted; and numeral 16 denotes internal connectors for electrically connecting the sensor boards 13 with the signal-processing boards 15. Numeral 17 denotes heat-radiating blocks formed of aluminum material, etc. by which heat generated by the reflection-type light sources 3 is dissipated.

Numeral 18 denotes a case for housing a telecentric imaging optical system as an imaging means (lens assembly) configured with a mirror system such as the first mirror 7 and the second mirror 11, and a lens system such as the first lens 8 and the second lens 10. Numeral 19 denotes a case for housing an illumination optical system (illumination unit) such as the reflection-type light sources 3 and the reflection-type light guide 4.

On the other hand, numeral 20 denotes a transmission-type light-source assembly that emits light in a direction perpendicular to the main-scanning direction of the document 1. In this transmission-type light-source assembly 20, numeral 21 denotes transmission-type light sources in which LED chips are straightly arrayed along the main-scanning direction; numeral 22 denotes a transmission-type light guide, formed of transparent material such as polycarbonate resin or soda lime glass, by which light emitted from the transmission-type light sources 21 is guided in sub-scanning directions; numeral 22a denotes a light exit portion of the transmission-type light guide 22; and numeral 22b denotes a reflective portion formed of a wedge-shaped groove whose faces are mirror-reflective or totally reflective, for reflecting light guided from the transmission-type light sources 21, and for outputting it from the light exit portion 22a. The light exited from the light exit portion 22a is configured to be incident on the document 1 positioned in the light-irradiation portion 5 along the conveying path.

The light exited from the light exit portion 22a is emitted approximately in parallel to the optical axis, of the imaging optical system, orthogonal to the conveying direction of the document 1. Numeral 23 denotes external connectors for supplying electric power for driving the transmission-type light sources 21; and numeral 24 denotes a case for storing the transmission-type light-source assembly 20. Numeral 25 denotes a conveying means that is provided outside the CIS 2, and configured with a platen roller, a pulley or the like, for conveying the document 1 in the conveying direction. Numeral 26 denotes a photo-sensor assembly for detecting a transparent portion of the document 1; and numeral 26T denotes a light emitter of the photo-sensor assembly 26, while numeral 26R a light receiver. In this figure, the same numerals represent the same or corresponding elements.

Figure 2:
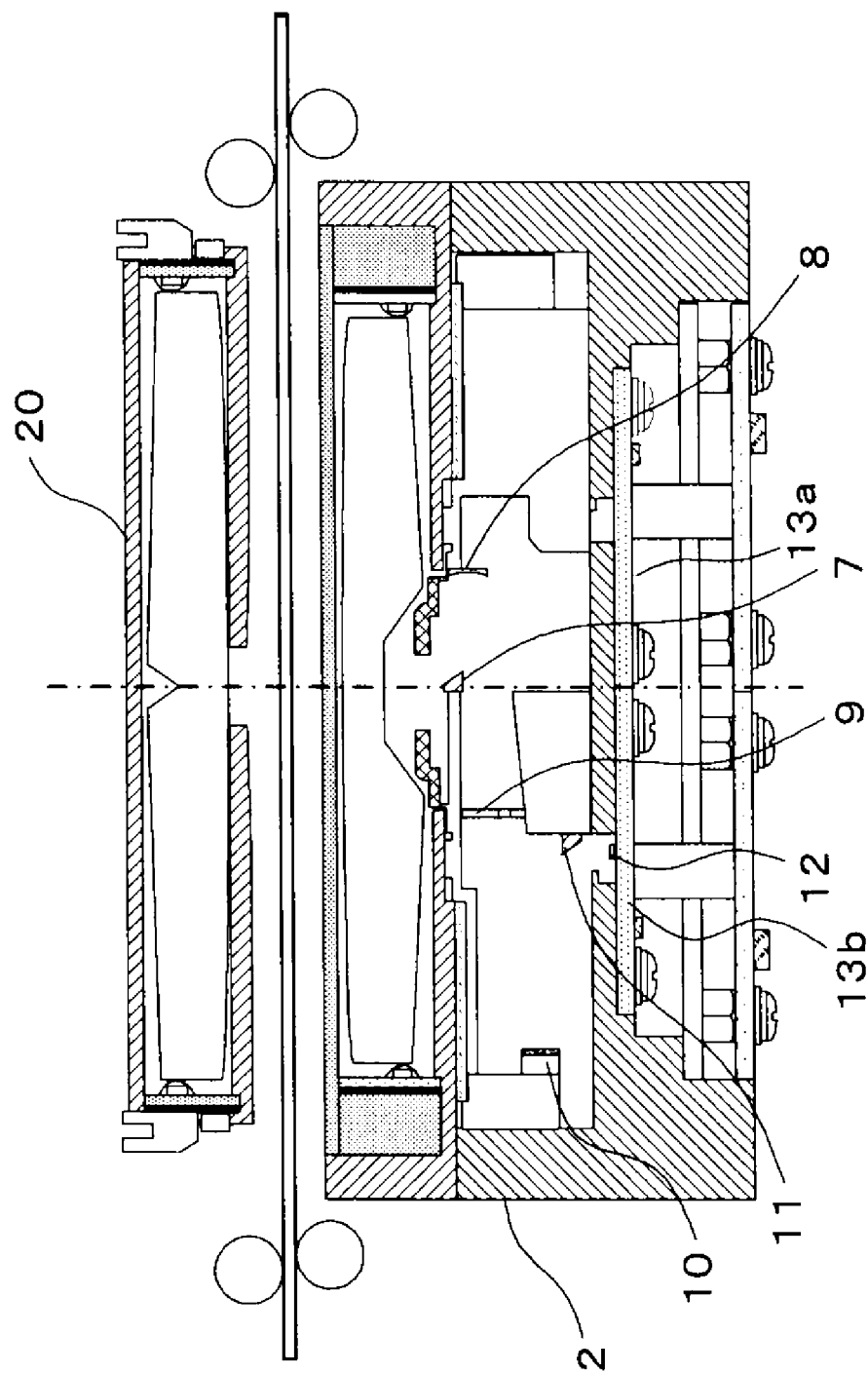
FIG. 2 is a cross-sectional view illustrating the image reading device according to Embodiment 1 of the present invention.

FIG. 2 is a cross-sectional view of the device in the main-scanning direction at a position different from that illustrated in FIG. 1, in which the imaging-optical-system portion that forms the light propagation channel is symmetrical to that illustrated in FIG. 1 with respect to the reading position for every adjacent blocks. In this figure, the same numerals as those in FIG. 1 represent the same or corresponding elements.

Figure 3:
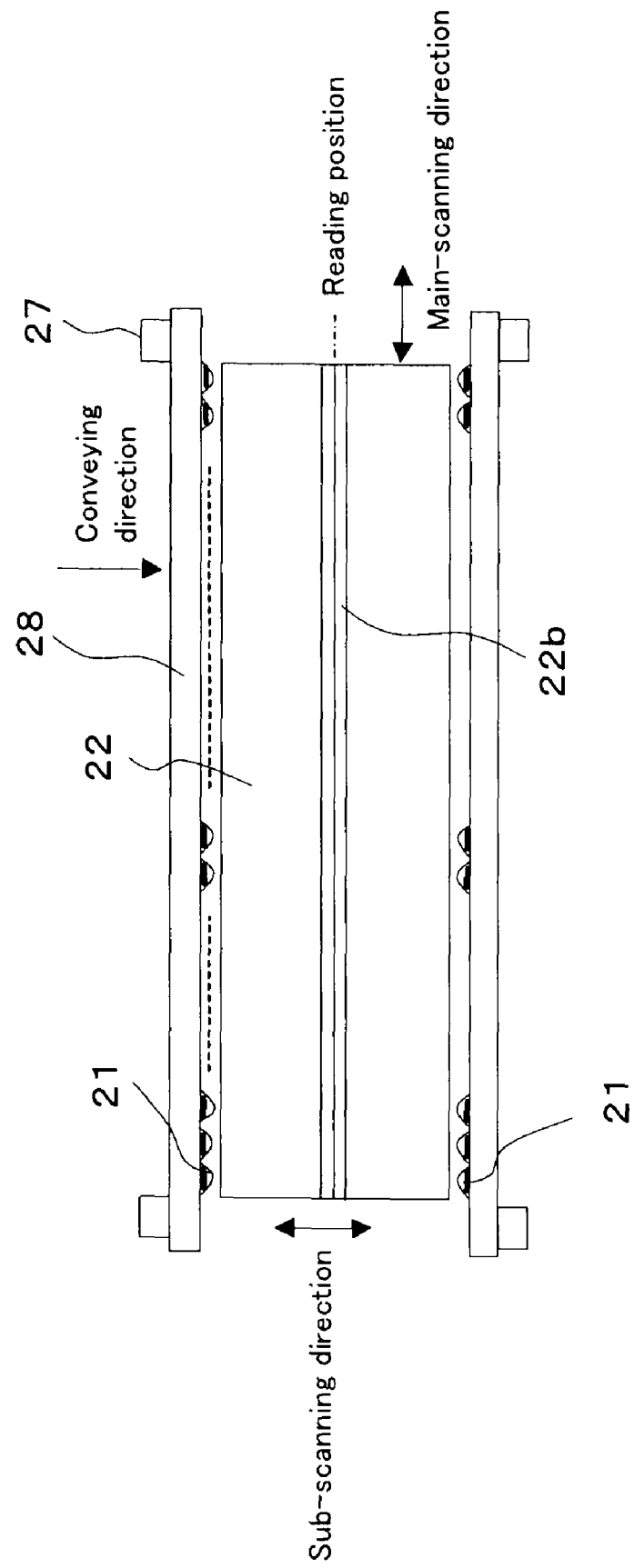
FIG. 3 is a schematic plan view illustrating a transmission-type light-source assembly of the image reading device according to Embodiment 1 of the present invention.

FIG. 3 is a schematic plan view illustrating the transmission-type light-source assembly 20, when the case 24 is removed, of the image reading device according to Embodiment 1 of the present invention. In FIG. 3, numeral 27 denotes internal connectors for supplying to the transmission-type light sources 21 electric power and control signals; and numeral 28 denotes substrates on which the transmission-type light sources 21 formed of a plurality of white-light-emitting LEDs arrayed in the main-scanning direction are mounted. In this figure, the same numerals as those in FIG. 1 represent the same or corresponding elements.

Figure 4:
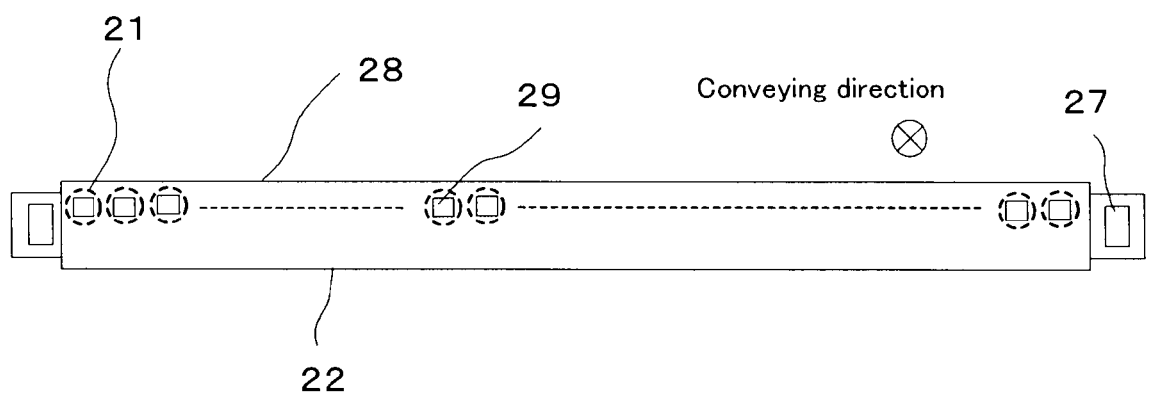
FIG. 4 is a schematic side view illustrating the transmission-type light-source assembly of the image reading device according to Embodiment 1 of the present invention.

FIG. 4 is a schematic side view viewed from a reading position of the transmission-type light-source assembly 20, when the case 24 is removed, of the image reading device according to Embodiment 1 of the present invention. In FIG. 4, numeral 29 denotes condenser lenses on which transparent mold resin such as silicone is spot-coated so that the LEDs mounted on the substrates 28 are covered for improving the light-collection ability in the light-emitting direction of the transmission-type light sources 21 configured of the white-light-emitting LEDs, which serves to limit directionality of the transmission-type light sources 21 to spread in sub-scanning directions. Here, in a case in which LED chips having single wavelength are used, by applying fluorescent resin to the condenser lenses 29 for generating fluorescence, a pseudo-white light source having a plurality of wavelengths may be used. In this figure, the same numerals as those in FIG. 1 represent the same or corresponding elements.

Figure 5:
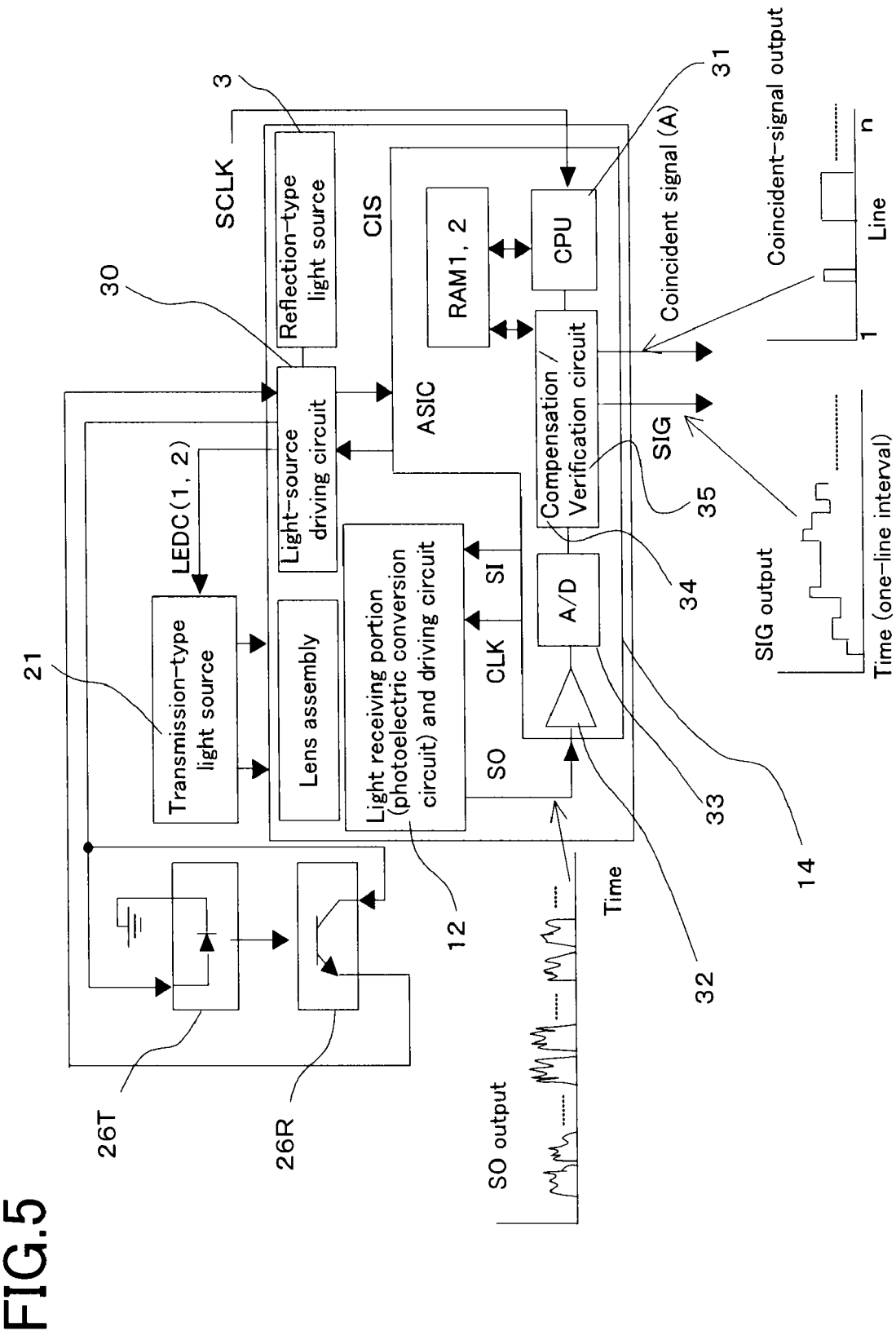
FIG. 5 is a block diagram of the image reading device according to Embodiment 1 of the present invention.

Next, an operation is explained. FIG. 5 is a block diagram of the image reading device according to Embodiment 1 of the present invention. In FIG. 5, numeral 30 denotes a light-source driving circuit (a lighting control means) for controlling a light-on/off operation of the reflection-type light sources 3 and the transmission-type light sources 21. Numeral 31 denotes a controller (a CPU), which also controls the light-source driving circuit 30. That is, a timing signal (a detection signal) for first detecting a transparent portion of the document 1 is inputted into the light-source driving circuit 30 and the CPU 31 by the photo-sensor assembly 26. At this time, when the conveying speed of the document 1 is constant, after a time corresponding to a predetermined distance L between the photo-sensor assembly 26 and the light-irradiation portion 5 has passed, the transparent portion of the document 1 reaches the light-irradiation portion 5. Therefore, by driving to control the light-source driving circuit 30 at that timing, the transmission-type light sources 21 are lighted-on, while the reflection-type light sources 3 are lighted-off. The CPU 31 controls the light-source driving circuit 30 so as to continue to light on the transmission-type light sources 21 and light off the reflection-type light sources 3 for a time during the photo-sensor assembly 26 detecting the transparent portion of the document 1.

On the other hand, after a reading system signal (SCLK) has been inputted into the CPU 31, while the photo-sensor assembly 26 does not detect the transparent portion of the document 1, the CPU 31 assumes that the reflective portion of the document 1 passes through the photo-sensor assembly 26, to drive and control the light-source driving circuit 30 so that the reflection-type light sources 3 are lighted on, while the transmission-type light sources 21 are lighted off. In this manner, by the CPU 31 driving to control the light-source driving circuit, the lighting-on/off of the reflection-type light sources 3 and the transmission-type light sources 21 is controlled. Here, numeral 32 denotes a variable amplifier for amplifying an analog signal (SO); numeral 33 denotes an A/D (analog-to-digital) converter for converting an analog signal to a digital signal; numeral 34 denotes a compensation circuit; and numeral 35 denotes a verification circuit. In this figure, the same numerals as those in FIG. 1 represent the same or equivalent members.

Figure 6:
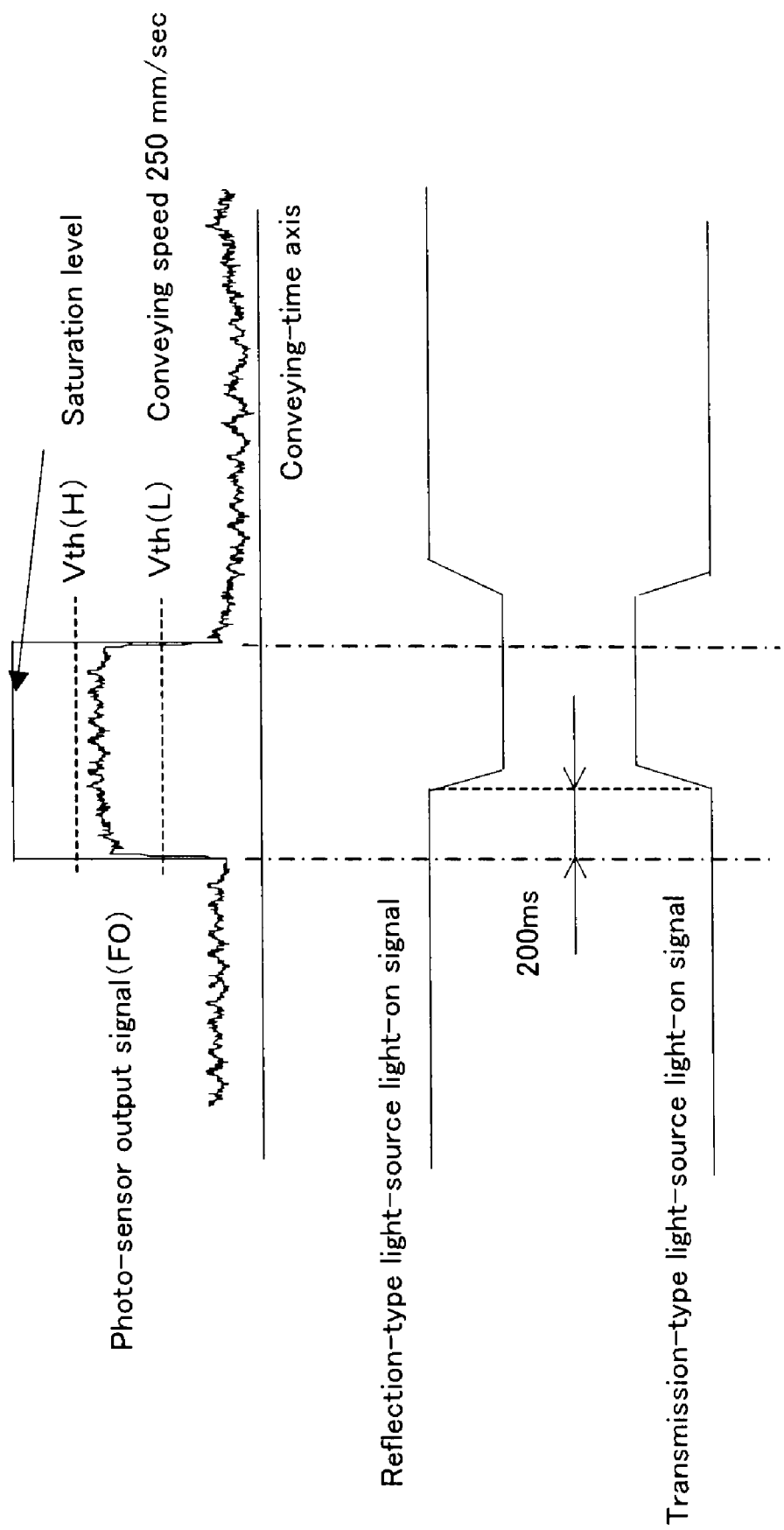
FIG. 6 is a timing chart of a photo-sensor of the image reading device according to Embodiment 1 of the present invention.

FIG. 6 is a time chart representing variations, with respect to the time axis, of a relationship between output signals (FOs) from the photo-sensor assembly 26 and light-on signals of the reflection-type light sources 3 and transmission-type light sources 21. The document 1 is assumed to be conveyed at a speed of, for example, 250 mm/sec. When the reflective portion of the document 1 is positioned at the photo-sensor assembly 26, because the output signal (FO) from the photo-sensor assembly 26 is located at a low level, the reflection-type light sources 3 is lighted-on (ON), while the transmission-type light sources 21 is lighted-off (OFF). However, when the transparent portion of the document 1 reaches the photo-sensor assembly 26, the output signal (FO) from the photo-sensor assembly 26 turns to a high level. At this time, for example, after 200 ms from the time when the output signal (FO) from the photo-sensor assembly 26 rises to a level within a predetermined range, that is, the range between Vth(L) and Vth(H), the reflection-type light sources 3 is lighted-off (OFF), while the transmission-type light sources 21 is lighted-on (ON). Then, the state continues for a period during the output signal (FO) from the photo-sensor assembly 26 being within the range between Vth(L) and Vth(H).

Figure 7:
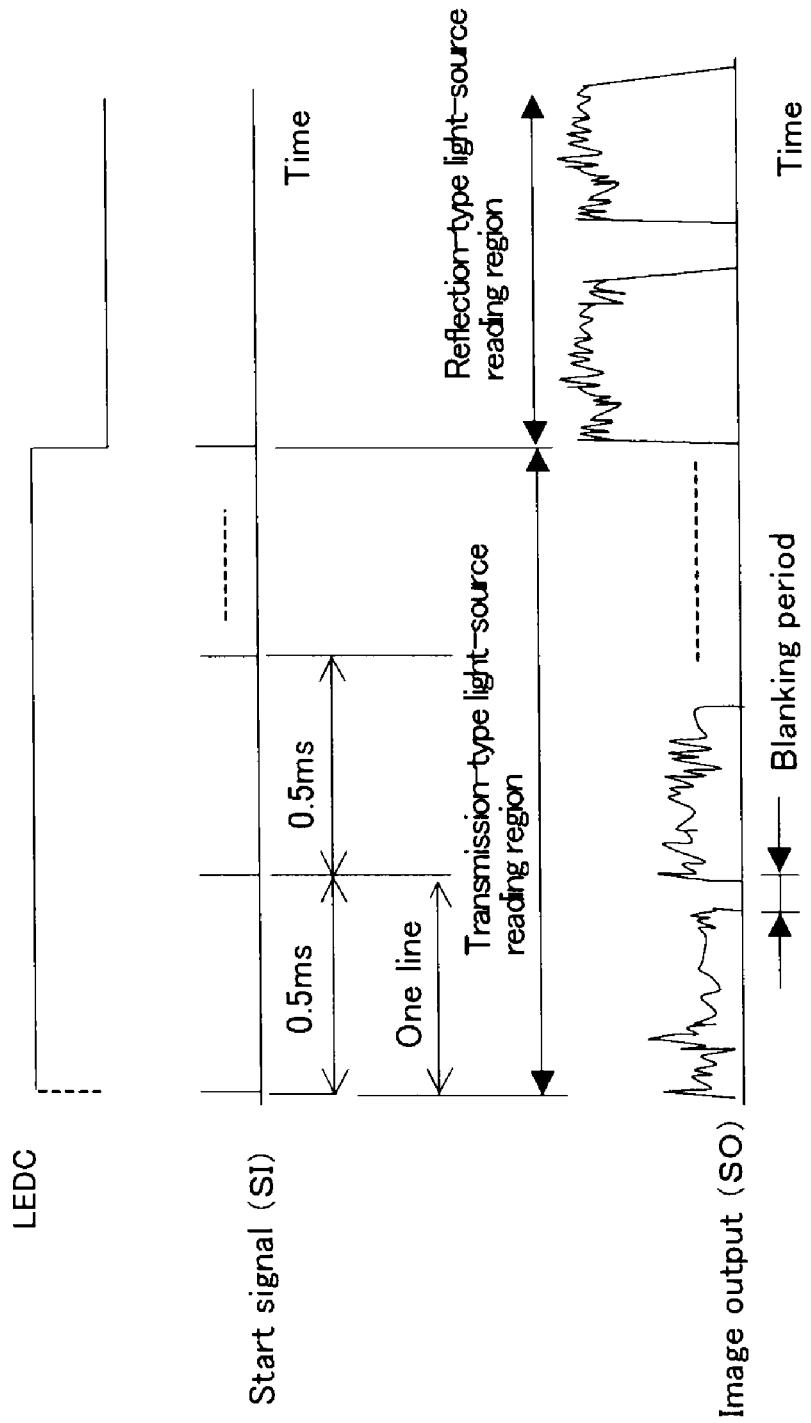
FIG. 7 is a drive timing chart of the image reading device according to Embodiment 1 of the present invention.

Time variation of image output signals (SOs) from the reflection-type light-source reading region and the transmission-type light-source reading region is represented in FIG. 7. Synchronizing with start signals (SIs), the image output signals (SOs) are sequentially generated. By providing a blanking period for each line output period, the reading time and the conveying speed can be varied.

Next, an overall block diagram illustrated in FIG. 5 is explained. First, when, based on the reading system signal (SCLK), a start signal (SI) of 0.5 ms/Line synchronizing with a clock signal (CLK) of the CIS 2 is inputted into the sensor ICs 12, according to this timing analog signals (SOs) photo-electric-converted are outputted from the sensor ICs 12. The SOs, after being amplified by the variable amplifier 32, are analog-to-digital (A/D) converted by the A/D converter 33, and then inputted into the compensation circuit 34 and the verification circuit 35. In the compensation circuit 34, a shading compensation that includes sample hold, a full-bit compensation, or the like are performed.

In the compensation of the digital-signal data obtained from the SOs, digital data, as reference-signal data previously set, stored in a RAM1 region is read out, and then image information obtained from the document 1 is calculated and processed together with the digital data by the compensation circuit 34. This operation is performed for homogenizing the photoelectric-conversion output from the sensor ICs 12, considering the characteristic variation among elements such as the reflection-type light sources 3, the transmission-type light sources 21, and the sensor ICs 12, etc. that constitute the CIS 2.

Figure 8:
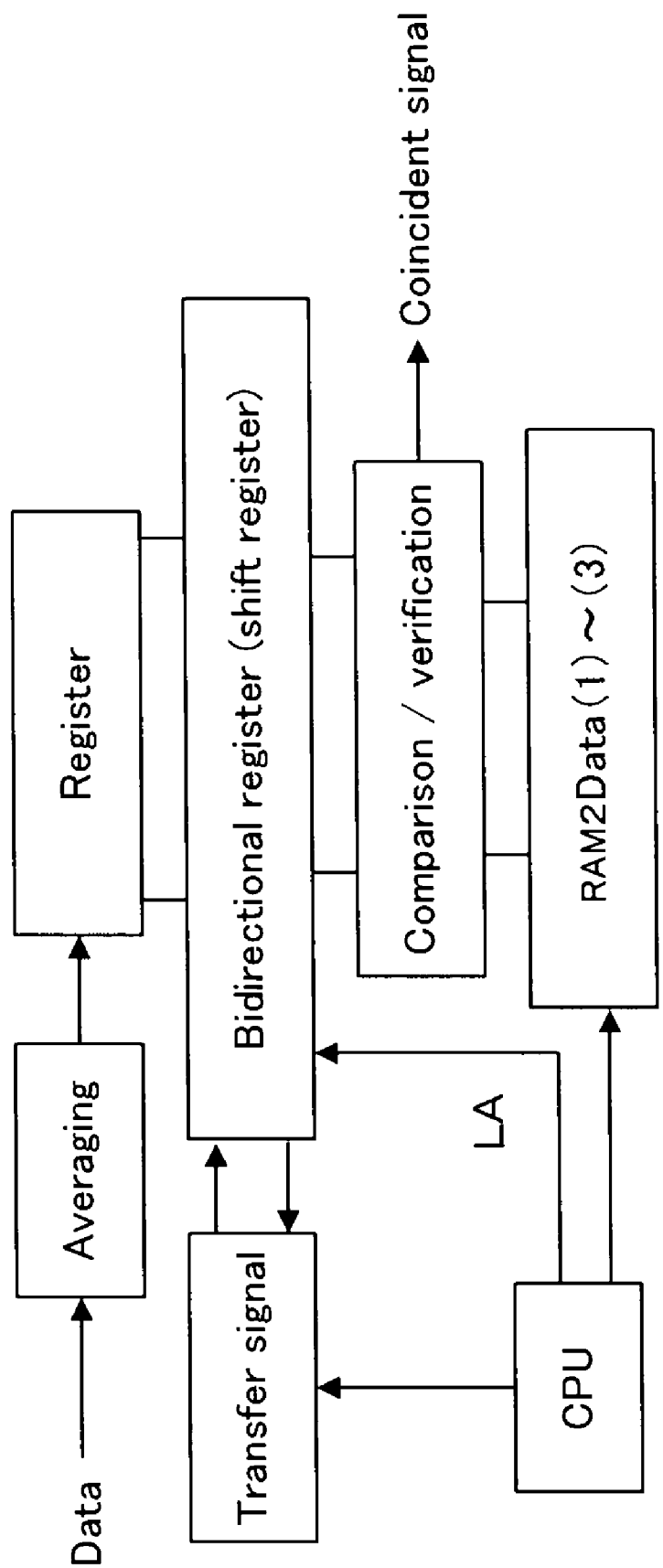
FIG. 8 is a block diagram of a verification circuit of the image reading device according to Embodiment 1 of the present invention.

Regarding the verification circuit 35 built in the compensation circuit 34, its configuration is illustrated in FIG. 8. The verification circuit 35 operates to read out from the RAM2 digital data corresponding to predetermined image patterns and true/false determination patterns for image signals from the transparent portion of the document 1, and to verify with actually read-out image data of the transparent portion. That is, when, by lighting on the transmission-type light sources 21, the transparent-portion image of the document 1 is read out, by lighting off the reflection-type light sources 3 stored in the CIS 2 as described above, the transparent portion of the document 1 is read; thus, the illuminance obtained is photo-electric converted by the sensor ICs 12 into image output signals (SIGs). Then, the image output signals (SIGs) are compared and verified with the transparent-portion image data stored in the RAM2, and when they agree with each other, a coincident signal (A) is outputted to the exterior.

Here, the details of the verification method are omitted to be explained, which is described in detail in Patent Document 4.

As described above, according to the image reading device in Embodiment 1, the device includes the light guide for guiding in the sub-scanning directions light from the light sources arranged in the main-scanning direction, and the light guide includes the reflective portion for reflecting the guided light, and for irradiating downward (epi-irradiating) the target positioned in the light-irradiation portion with the reflected light; therefore, an image reading device for reading a light-transparent portion of the target, in which a planar compact illumination part is installed can be obtained.

Embodiment 2

Figure 9:
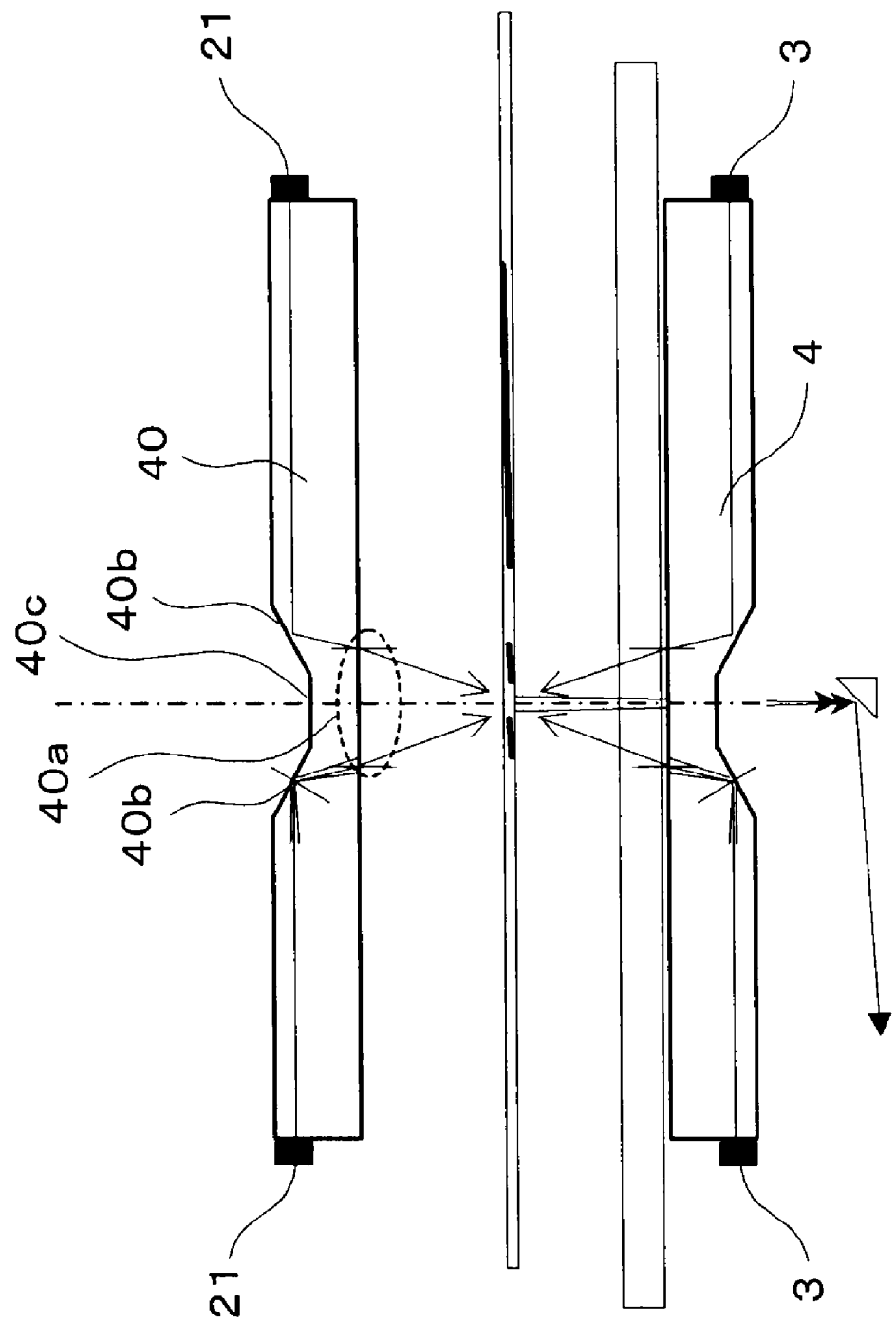
FIG. 9 is a schematic cross-sectional view illustrating an illumination optical system, including transmission-type light sources, of an image reading device according to Embodiment 2 of the present invention.

Although, in Embodiment 1, the transmission-type light-source assembly 20 has been configured with the transmission-type light guide 22 having a wedge-shaped groove, a device configured with a transmission-type light guide having a flat concave portion is explained in Embodiment 2. FIG. 9 is a schematic cross-sectional view of an illumination optical system including a transmission-type light-source assembly of an image reading device according to Embodiment 2. In FIG. 9, numeral 40 denotes a transmission-type light guide, formed of transparent material such as polycarbonate resin and soda-lime glass, for guiding in sub-scanning directions light emitted from the transmission-type light sources 21; numeral 40a denotes a light exit portion of the transmission-type light guide 40; and numeral 40b denotes a reflective portion, formed by a mirror-reflection face or a total-reflection face, for reflecting light guided from the transmission-type light sources 21, and exiting the light from the light exit portion 40a. Thus, the device is configured in such a way that the light exited from the light exit portion 40a is incident on the light-irradiation portion 5 along the conveying path of the document 1.

Here, light exited from the light exit portion 40a is emitted, when the reflective portion 40b is configured of total-reflection faces, at an angle not larger than 45 degrees with respect to the optical axis, of the imaging optical system, orthogonal to the conveying direction of the document 1. Numeral 40c denotes a flat face (flat portion) of the transmission-type light guide 40, where, by varying the size of the flat portion, a predetermined irradiation angle can be obtained. The rest of the configurations and operations are the same as those explained in Embodiment 1. In this figure, the same numerals as those in FIG. 1 represent the same or corresponding portions.

As described above, according to the image reading device in Embodiment 2, the device includes the light guide for guiding in the sub-scanning directions light from the light sources arranged in the main-scanning direction, and the light guide includes the reflective portion for reflecting the guided light, and for obliquely irradiating the portion, to be light-irradiated, of the target with the reflected light; therefore, an image reading device in which a flat-plate compact illumination part is installed can be obtained, by which the light-transparent portion of the target can be read, and highly-accurate image reading can be performed for a transparent pattern having undulating surfaces.

Embodiment 3

Figure 10:
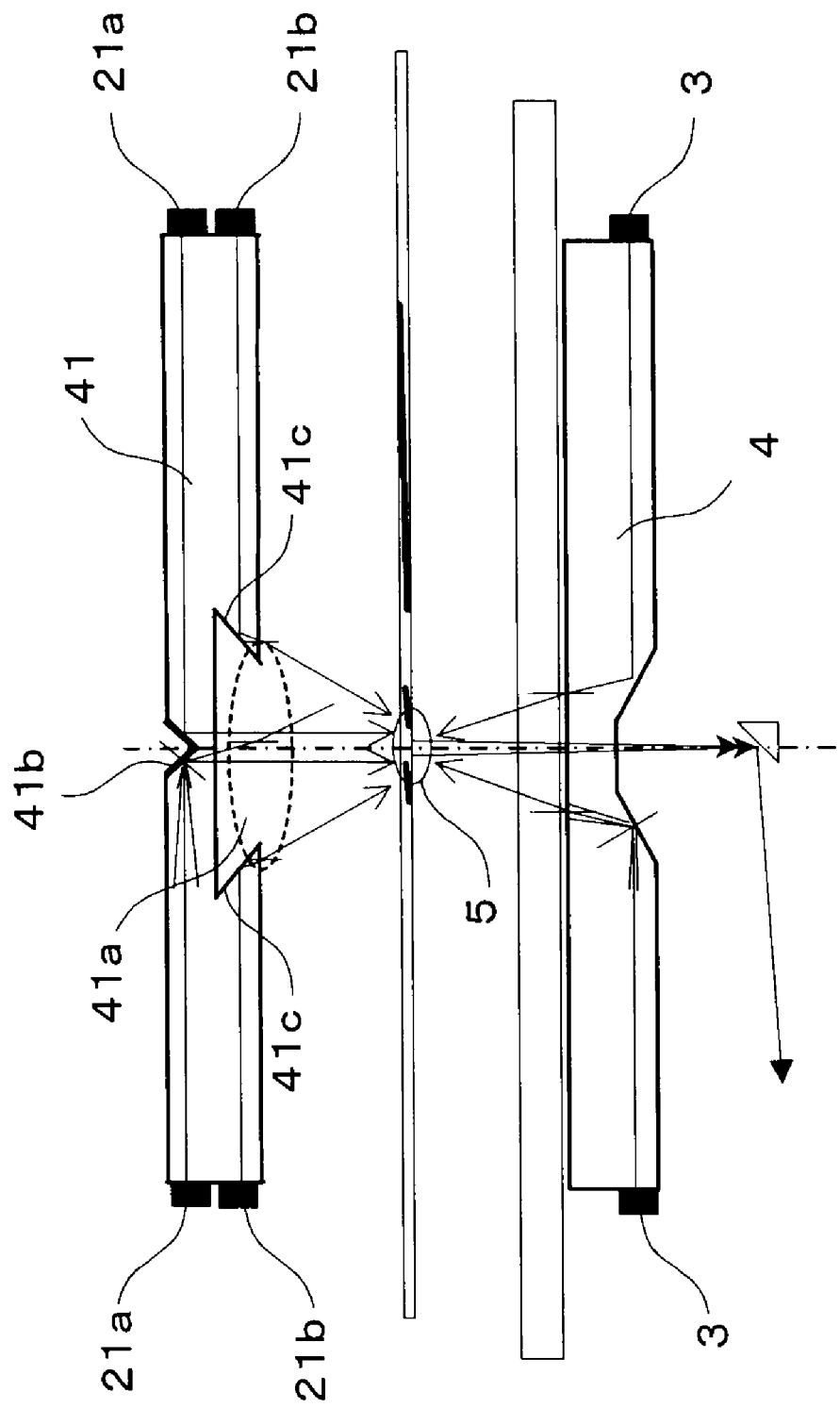
FIG. 10 is a schematic cross-sectional view illustrating an illumination optical system, including transmission-type light sources, of an image reading device according to Embodiment 3 of the present invention.

Although, in each of Embodiments 1 and 2, the transmission-type light-source assembly has been configured in such a way that light emitted therefrom is exited at predetermined irradiation angles, in Embodiment 3, a transmission-type light-source assembly is explained from which light can be exited at different tilt angles. FIG. 10 is a schematic cross-sectional view of an illumination optical system including a transmission-type light-source assembly of an image reading device according to Embodiment 3. In FIG. 10, numeral 21a denotes first-row transmission-type light sources; numeral 21b denotes second-row transmission-type light sources; numeral 41 denotes a transmission-type light guide, formed of transparent material such as polycarbonate resin and soda-lime glass, for guiding in sub-scanning directions light emitted from the transmission-type light sources 21; numeral 41a denotes a light exit portion of the transmission-type light guide 41; and numeral 41b denotes a reflective portion having a wedge-shaped concave portion, formed by mirror-reflection faces or total-reflection faces, for reflecting light guided from the transmission-type light sources 21, and exiting the light from the light exit portion 40a. The irradiation light is exited from the light exit portion 41a approximately in parallel to the optical axis, of the imaging optical system, orthogonal to the conveying direction of the document 1.

Numeral 41c denotes tilted faces (mirror faces) formed by cutting off an opposite portion of the transmission-type light guide 41, whose faces facing the reflective portion 41b, by which light is exited at an angle not larger than 45 degrees with respect to the optical axis, of the imaging optical system, orthogonal to the conveying direction of the document 1. The transmission-type light guide 41 is configured in such a way that light, exited from the light exit portion 41a, whose irradiation angles are different from each other, is incident on the light-irradiation portion 5 along the conveying path of the document 1.

The structures of the reflective portion 41b and the reflective portion (tilted faces) 41c each for reflecting light guided from the transmission-type light sources 21a (referred to as first light sources) and from the transmission-type light sources 21b (referred to as second light sources) that are provided on an edge of the light guide, and each for reflecting light guided from the transmission-type light sources 21a (referred to as third light sources) and from the transmission-type light sources 21b (referred to as fourth light sources) that are provided on the other edge of the light guide are plane symmetrical, respectively.

Figure 11:
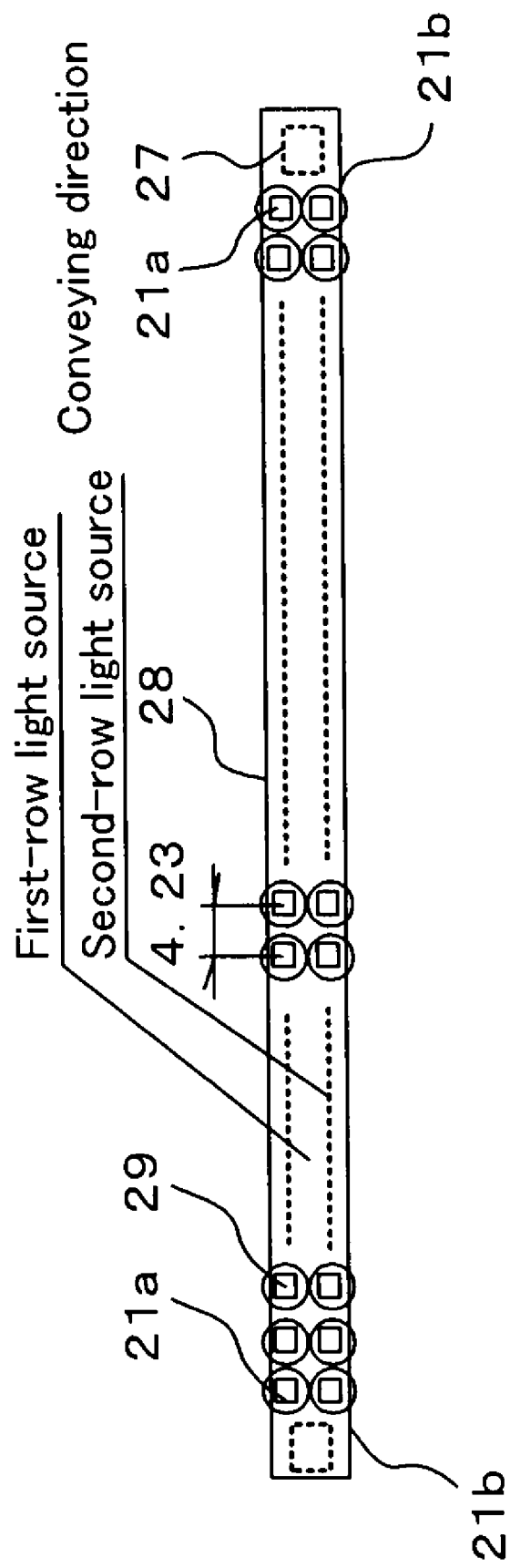
FIG. 11 is an explanatory view illustrating transmission-type light sources mounted on a substrate of the image reading device according to Embodiment 3 of the present invention.

FIG. 11 is a view explaining the transmission-type light sources mounted on a substrate 28 of the image reading device according to Embodiment 3 of the present invention. In FIG. 11, numeral 21a is the first-row light-sources (the first light sources) arranged, in an array manner with a pitch of 4.23 mm, on a face perpendicular to the conveying direction, and numeral 21b is the second-row light-sources (the second light sources) arranged, in parallel to the first-row light sources 21a, on the face perpendicular to the conveying direction. Here, the first light sources 21a and the second light sources 21b have been arranged on the single substrate 28; however, they may be placed in parallel to each other on respective substrates provided independently to each other, or, in order to control the relative illuminance levels of the first light sources 21a and the second light sources 21b, they may be configured so as to be a little apart from each other in a sub-scanning direction.

Figure 12:
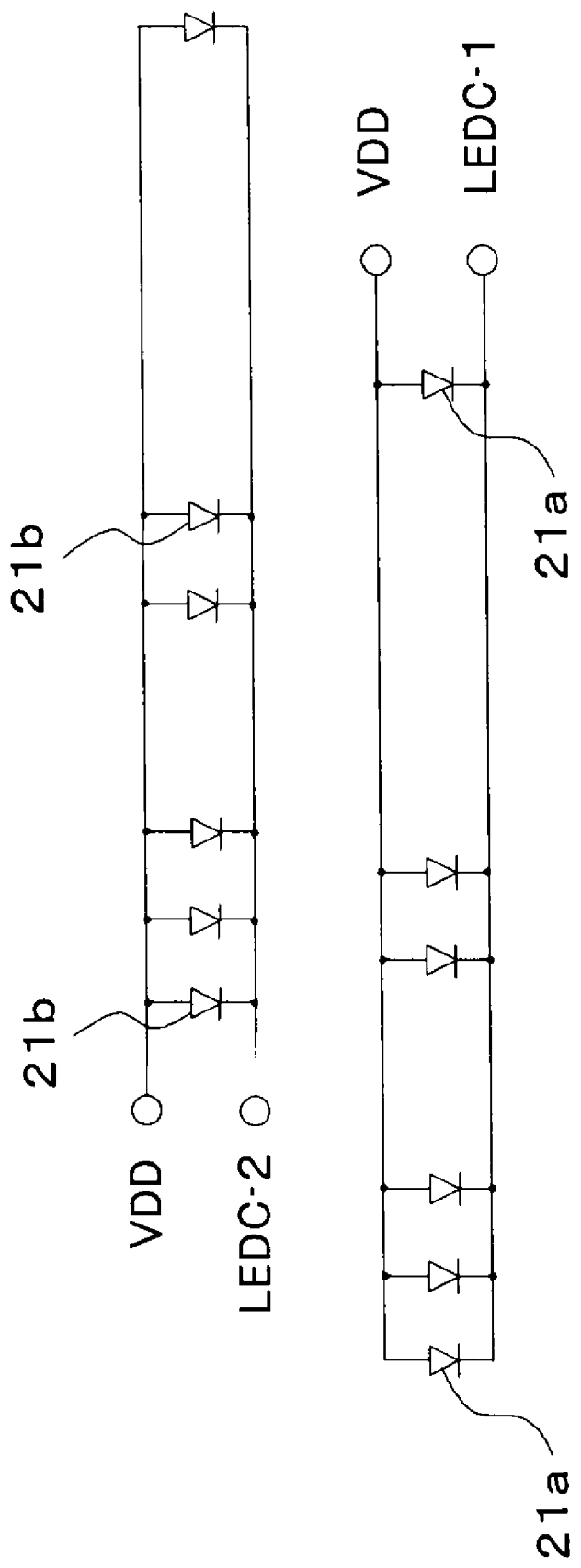
FIG. 12 is a wire-connection diagram of a transmission-type light source portion included in the image reading device according to Embodiment 3 of the present invention.

FIG. 12 is a wire-connection diagram of the transmission-type light-source portion of the image reading device according to Embodiment 3 of the present invention. In FIG. 12, regarding the first-row light sources 21a of the transmission-type light sources 21 and the second-row light sources 21b, arranged in parallel thereto, of the transmission-type light sources 21, independent circuits are formed therefor, and, by control signals from LED-control-signal terminals (LEDC-1 and LEDC-2), electric power is supplied from electric-power-source terminals (VDD) to make light-on/off operations.

Figure 13:
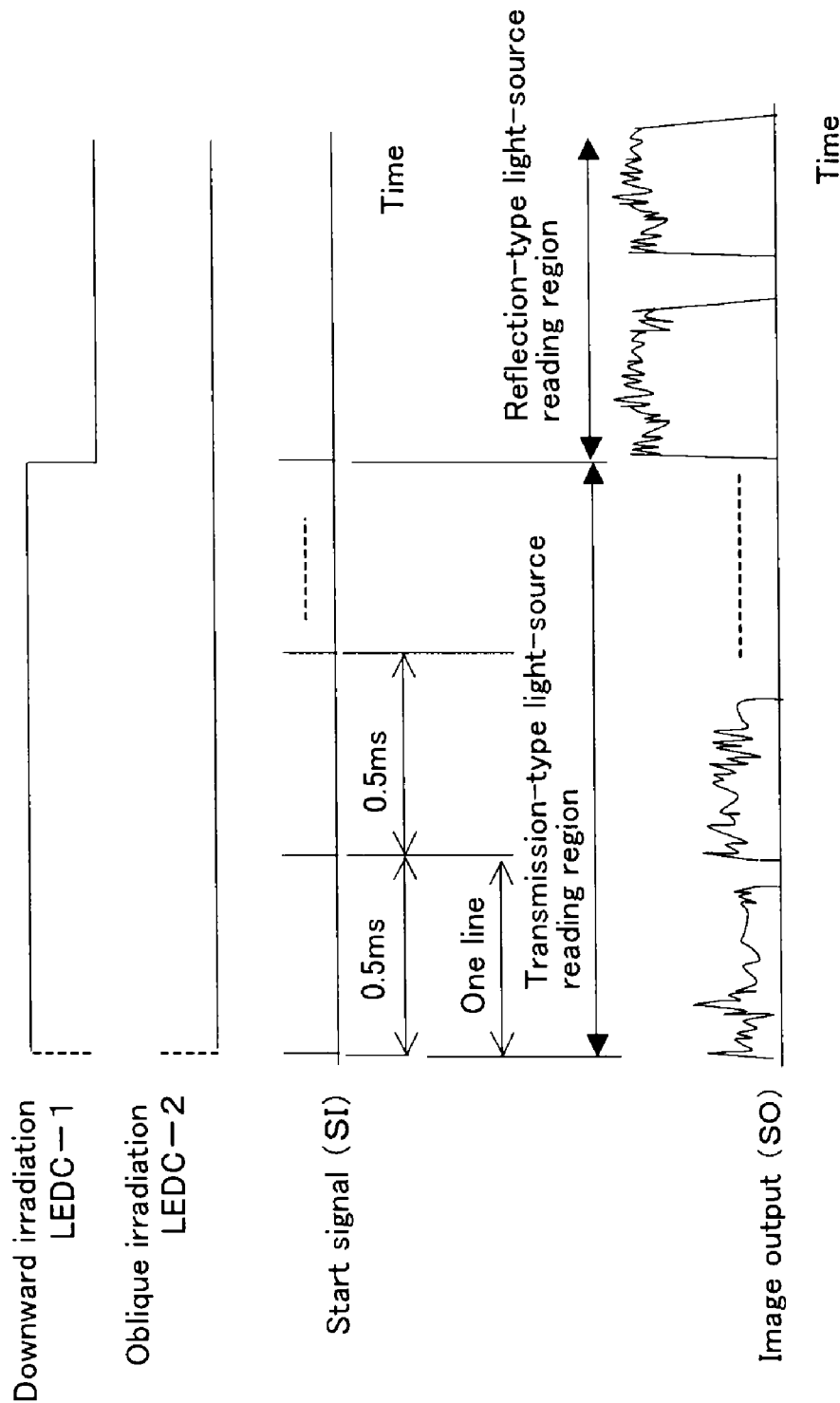
FIG. 13 is a drive timing chart of the image reading device according to Embodiment 3 of the present invention.

Next, drive timing of the image reading device according to Embodiment 3 is explained using FIG. 13. In FIG. 13, when downward irradiation is performed, the ASICs 14 turn on the light-source lighting signal (LEDC-1) (switch-on) interlocking with the CPU 31, and the light-source driving circuit 30 supplies electric power to the first light sources 21a; then, the first light sources 21a operate to illuminate the light-irradiation portion 5 just below the transmission-type light guide. During this operation, synchronizing with the continuously driving CLK signal, the start signal (SI) sequentially operates to switch on the output from the shift register, for each of elements (pixel elements), which constitutes the driving circuit of the sensor ICs 12; thus, the corresponding switch set sequentially switches on/off the common line (SO), and image information (SIG) synchronizing with the CLK can be resultantly obtained.

When the oblique irradiation is performed, the light-source lighting signal (LEDC-2) is turned on (switched on), and the light-source driving circuit 30 supplies electric power to the second light sources 21b, so that the second light sources 21b operates to obliquely irradiate the light-irradiation portion 5. The start signal (SI) sequentially operates to switch on the output from the shift register, for each of elements, which constitutes the driving circuit of the sensor ICs 12; thus, the corresponding switch set sequentially switches on/off the common line (SO), and image information (SIG) synchronizing with the CLK can be resultantly obtained.

As described above, according to the image reading device of Embodiment 3, light from the plurality rows of light sources arranged in parallel to each other on the face perpendicular to the conveying direction is guided in the sub-scanning directions, and the document can be irradiated at angles different from each other in the transmission-type light guide; therefore, an effect can be obtained that, when a rough surface of a transparent portion such as a watermark of a banknote is read and determined to be true or false, reading is performed with the oblique irradiation, while, when the size of a plane pattern image such as a transparent film is read out, reading is performed with the downward irradiation, whereby switchable reading such as the true/false determination and the highly-accurate pattern-size measurement can be realized using a single type of a transmission-type light-source assembly.

Embodiment 4

Figure 14:
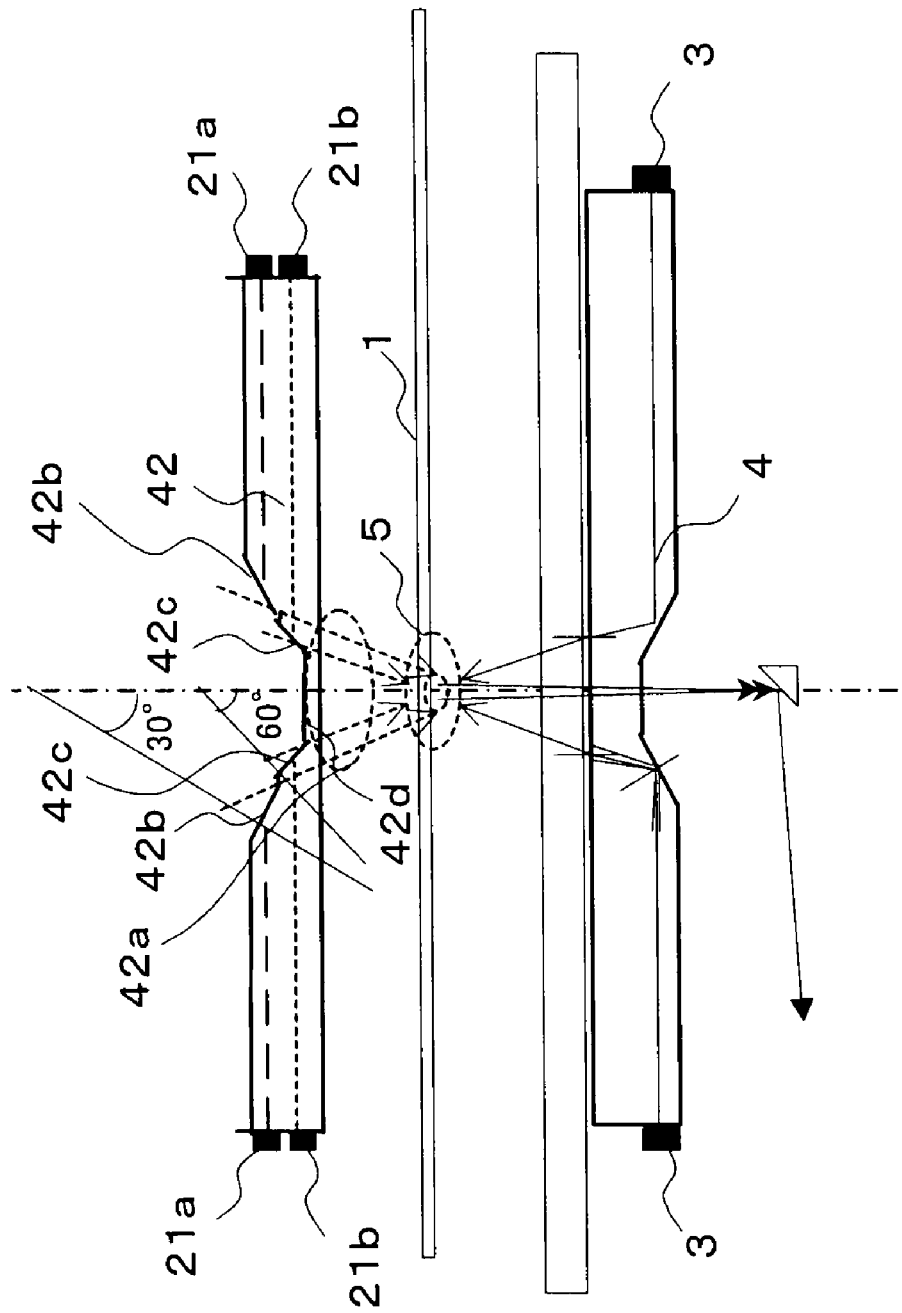
FIG. 14 is a schematic cross-sectional view illustrating an illumination optical system, including transmission-type light sources, of an image reading device according to Embodiment 4 of the present invention.

Although, in Embodiment 3, the transmission-type light-source assembly has been configured in such a way that the irradiation light is downward and oblique, in Embodiment 4, a transmission-type light-source assembly is explained by which a plurality of oblique irradiation operations for irradiating at different angles can be performed. FIG. 14 is a schematic cross-sectional view of an illumination optical system including a transmission-type light-source assembly of an image reading device according to Embodiment 4. In FIG. 14, numeral 42 denotes a transmission-type light guide, formed of transparent material such as polycarbonate resin and soda-lime glass, for guiding in sub-scanning directions light emitted from the transmission-type light sources 21; numeral 42a denotes a light exit portion of the transmission-type light guide 42; numeral 42b denotes a reflective portion (first total-reflection faces) whose center is positioned along the optical-axis center of the light emitted from the transmission-type light sources 21a; numeral 42c denotes a reflective portion (second total-reflection faces) whose center is positioned along the optical-axis center of the light emitted from the transmission-type light sources 21b; and numeral 42d denotes a flat portion.

Here, the total-reflection faces 42b and 42c are formed by cutting off a portion, of the transmission-type light guide 42, in the vicinity of the light-irradiation portion 5. This portion is referred to as a cut-off portion.

The structures of the total-reflection face 42b and the total-reflection face 42c each for reflecting light guided from the transmission-type light sources 21a (the first light sources) and from the transmission-type light sources 21b (the second light sources) that are provided on an edge of the light guide, and each for reflecting light guided from the transmission-type light sources 21a (the third light sources) and from the transmission-type light sources 21b (the fourth light sources) that are provided on the other edge of the light guide are plane symmetrical, respectively.

Figure 15:
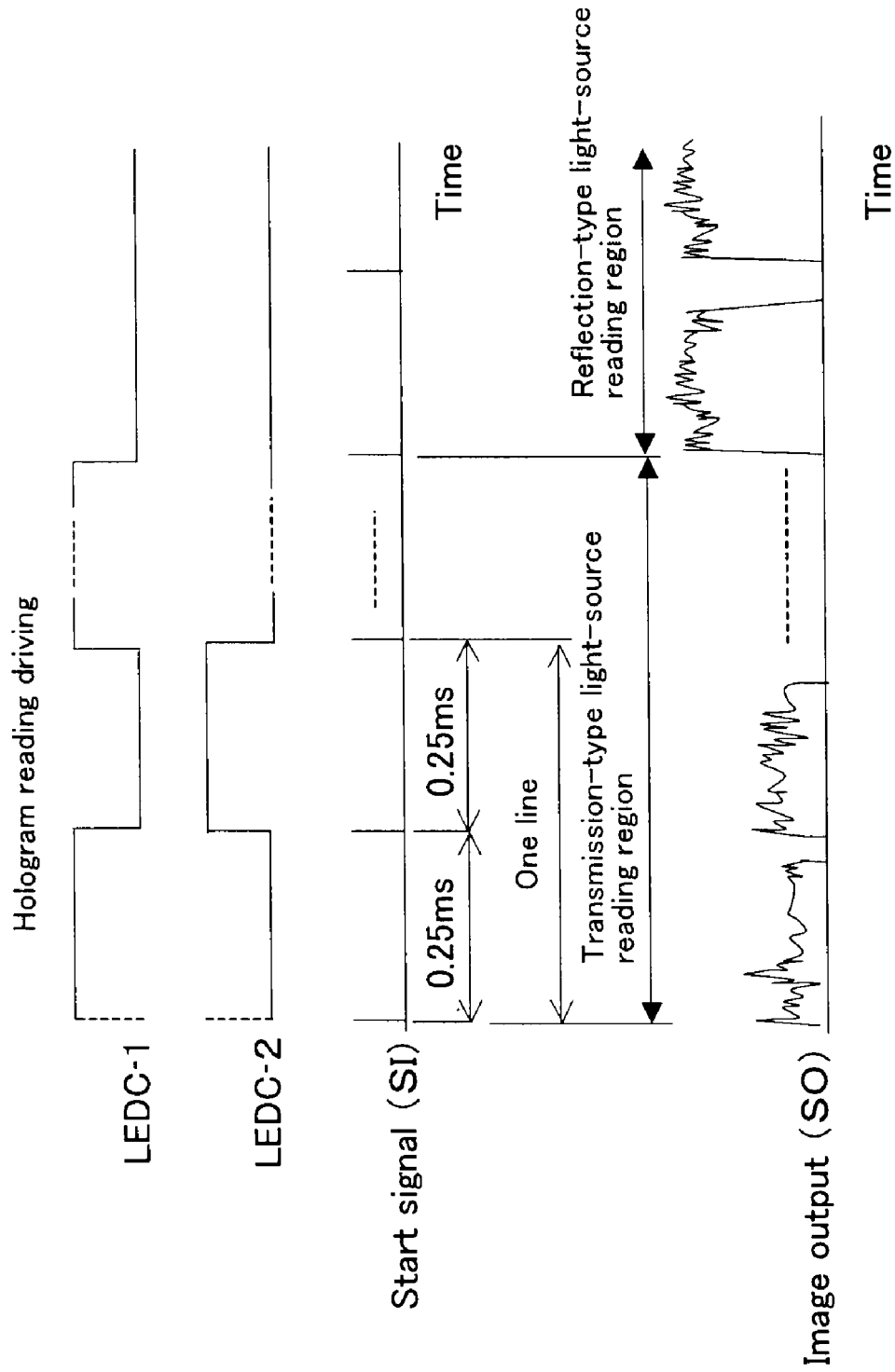
FIG. 15 is a drive timing chart of the image reading device according to Embodiment 4 of the present invention.

Next, drive timing of the image reading device according to Embodiment 4 is explained using FIG. 15. FIG. 15 represents that the ASICs 14 turn on the light-source lighting signal (LEDC-1) (switch-on) for a period of 0.25 ms interlocking with the CPU 31, and thus the light-source driving circuit 30 supplies electric power to the transmission-type light sources 21a, so that the light sources 21a emits white light. During this operation, synchronizing with the continuously driving CLK signal, the start signal (SI) sequentially operates to switch on the output from the shift register, for each of elements (pixel elements), which constitutes the driving circuit of the sensor ICs 12; thus, the corresponding switch set sequentially switches on/off the common line (SO), and image information (SIG) synchronizing with the CLK can be resultantly obtained.

Then, the light-source lighting signal (LEDC-2) is turned on (switched on) for a period of 0.25 ms, the light-source lighting signal (LEDC-1) is turned off (switched off), and the light-source driving circuit 30 supplied electric power to the transmission-type light sources 21b, so that the light sources 21b emits white light. The start signal (SI) sequentially operates to switch on the output from the shift register, for each of elements, which forms the driving circuit of the sensor ICs 12, and by sequentially switching on/off with the corresponding switch set the common line (SO), image information (SIG) synchronizing with the CLK can be obtained. After the operation described above, the reading-out operation for one line is completed, and then the operational process is moved to the next-line reading.

As described above, according to the image reading device of Embodiment 4, light from a plurality rows of light sources arranged in parallel to each other on the face perpendicular to the conveying direction is guided in the sub-scanning directions, and the document 1 can be irradiated at angles different from each other in the transmission-type light guide 42; therefore, an effect can be obtained that, by guiding the light, in the sub-scanning directions, from the plurality rows of light sources arranged in parallel on the face perpendicular to the conveying direction, by controlling in time division the exposure ratio of the light incident on the different total-reflection faces of the transmission-type light guide 42, and by receiving the light by the sensor ICs 12 for each time division, variations of the hologram image using the transmission light can be detected in a short time, and thus true/false determination can be resultantly performed.

Embodiment 5

Figure 16:
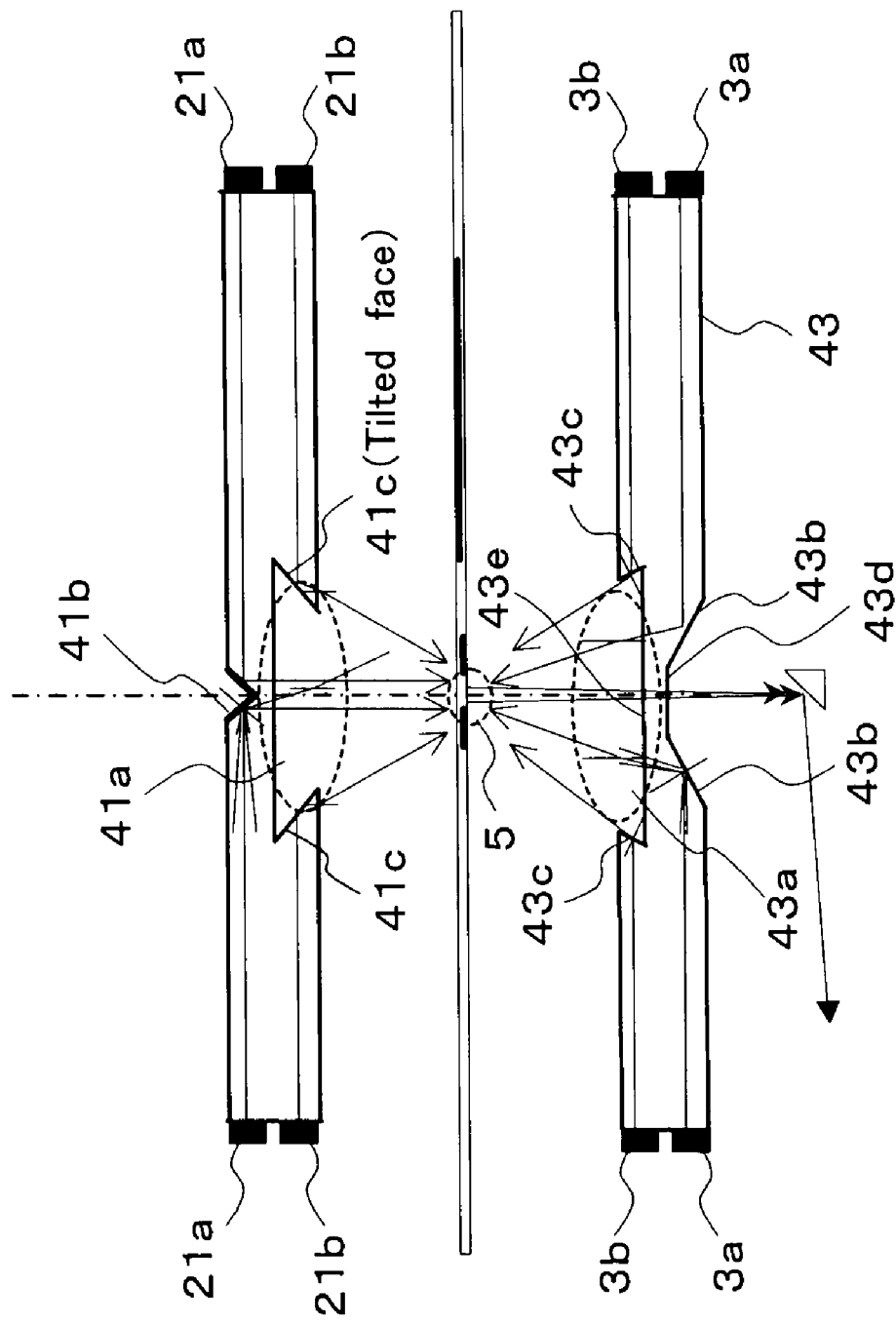
FIG. 16 is a schematic cross-sectional view illustrating an illumination optical system, including reflection-type light sources, of an image reading device according to Embodiment 5 of the present invention.

Although, in Embodiment 4, the transmission-type light guide has been configured in such a way that the exposure ratio of light incident on the different total-reflection faces of the transmission-type light guide 42 has been controlled in time division, and the light exited therefrom is received by the sensor ICs 12, in Embodiment 5, a reflection-type light guide is explained by which light from the reflection-type light guide 4 can be exited at oblique angles different from each other. FIG. 16 is a schematic cross-sectional view of an illumination optical system including a reflection-type light-source assembly of an image reading device according to Embodiment 5. In FIG. 16, numeral 3a denotes first-row reflection-type light sources, numeral 3b denotes second-row reflection-type light sources, numeral 43 denotes a reflection-type light guide, formed of transparent material such as polycarbonate resin and soda-lime glass, for guiding in sub-scanning directions light emitted from the reflection-type light sources 3a and 3b; numeral 43a denotes a light exit portion of the reflection-type light guide 43; and numeral 43b denotes reflective portions (first reflective faces), being formed by cutting off a portion of the reflection-type light guide 43, whose center is positioned along the optical-axis center of the light emitted from the reflection-type light sources 3a. Irradiation light is exited from the first reflective faces 43b at an angle not larger than 45 degrees with respect to the optical axis, of the imaging optical system, orthogonal to the conveying direction of the document 1.

Numeral 43c denotes reflective portions (second reflective faces), being formed by cutting off a portion opposite to the reflective portions 43b of the reflection-type light guide 43, in which the center of the tilted faces are positioned along the optical-axis center of the light emitted from the reflection-type light sources 3b. Irradiation light is exited from the second reflective faces 43c at an angle not smaller than 45 degrees with respect to the optical axis, of the imaging optical system, orthogonal to the conveying direction of the document 1. Moreover, the configuration is such that the light, whose irradiation angles are different from each other, exited from the light exit portion 43a is incident on the document 1 positioned in the light-irradiation portion 5 along the conveying path of the document 1. Numeral 43d denotes a flat portion in the vicinity of the first reflective faces 43b; and numeral 43e denotes a flat portion in the vicinity of the second reflective faces 43c. In this figure, the same numerals as those in FIG. 1 represent the same or corresponding portions.

As described above, according to the image reading device of Embodiment 5, light from the plurality rows of light sources arranged in parallel to each other on the face perpendicular to the conveying direction is guided in the sub-scanning directions, and the document 1 can be irradiated at angles different from each other in the reflection-type light guide 43; therefore, an effect can be obtained that, by directly guiding the light, in the sub-scanning directions, from the plurality rows of light sources arranged in parallel to each other on the face perpendicular to the conveying direction, by controlling in time division the exposure ratio of the light incident on the different total-reflection faces of the reflection-type light guide 43, and by receiving the light by the sensor ICs 12 for each time division, variations of the hologram image using the reflection light can be detected in a short time, and thus true/false determination can be resultantly performed.

Embodiment 6

Figure 17:
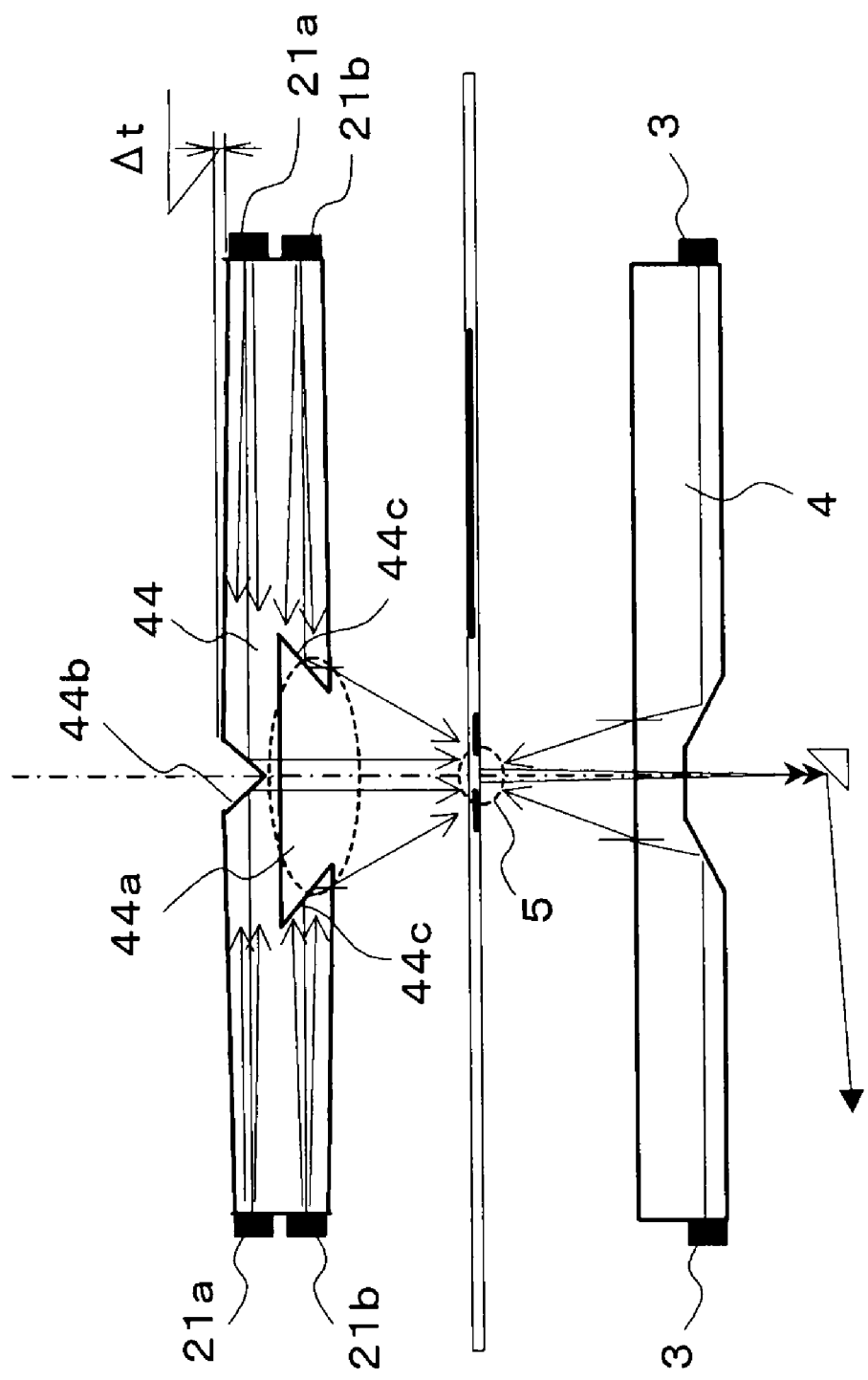
FIG. 17 is a schematic cross-sectional view illustrating an illumination optical system, including transmission-type light sources, of an image reading device according to Embodiment 6 of the present invention.

Although, in each of Embodiments 3-5, the light guide has been configured in such a way that light emitted from the plurality rows of light sources arranged in parallel to each other on the face perpendicular to the conveying direction is guided in the sub-scanning directions, and is incident on each of corresponding reflective portions of the light guide, in Embodiment 6, a structure of an image reading device is explained in which the amount of light incident on the wrong reflective portion is reduced. FIG. 17 is a schematic cross-sectional view of an illumination optical system including transmission-type light sources of an image reading device according to Embodiment 6. In FIG. 17, numeral 44 denotes a transmission-type light guide, formed of transparent material such as polycarbonate resin and soda-lime glass, for guiding in sub-scanning directions light emitted from the transmission-type light sources 21; numeral 44*a* denotes a light exit portion of the transmission-type light guide 44; and numeral 44*b* denotes a reflective portion having a wedge-shaped concave portion, formed by mirror-reflection faces or total-reflection faces, for reflecting light guided from the transmission-type light sources 21, and exiting the light from the light exit portion 44*a*. The irradiation light is exited from the light exit portion 44*a* approximately in parallel to the optical axis, of the imaging optical system, orthogonal to the conveying direction of the document 1.

Numeral 44*c* denotes tilted faces (mirror faces) formed by cutting off an opposite portion whose faces facing the reflective portion 44*b* of the transmission-type light guide 44, by which irradiation light is exited at an angle not larger than 45 degrees with respect to the optical axis, of the imaging optical system, orthogonal to the conveying direction of the document 1. Thereby, the transmission-type light guide 44 is configured in such a way that light, exited from the light exit portion 44*a*, whose irradiation angles are different from each other, is incident on the document 1 positioned in the light-irradiation portion 5 along the conveying path.

Although light exited in sub-scanning directions from the edges of the transmission-type light guide 44 is focused by the condenser lenses 29, its focusability is slightly spoiled at the side of the light exit portion 44*a*; therefore, by increasing the thickness of the transmission-type light guide 44 (expressed by Δt) as approaching the light exit portion 44*a* from the edges of the transmission-type light guide 44, and by increasing the area of the reflective faces 44*b* and the tilted faces 44*c*, the amount of light incident on the tilted faces 44*c* emitted from the transmission-type light sources 21*a* and that on the reflective faces 44*b* emitted from the transmission-type light sources 21*b* are reduced.

Embodiment 7

Figure 18:
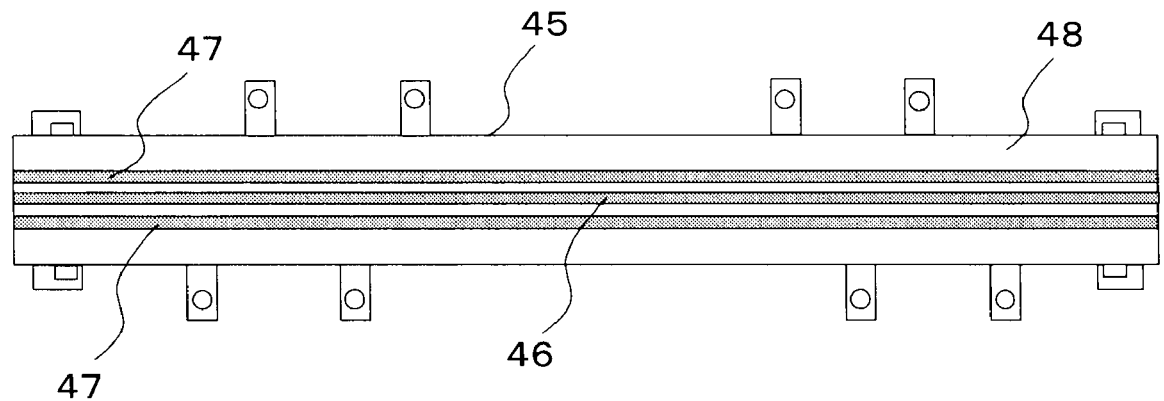
FIG. 18 is a plan view illustrating a transmission-type light-source assembly of an image reading device according to Embodiment 7 of the present invention.

Although, in each of Embodiments 1-6, light exited from the light exit portion of the light guide has been directly incident on the light-irradiation portion 5, in Embodiment 7, a structure of an image reading device is explained in which the irradiation of needless light is prevented, and the range of the irradiation angle is made to be narrow. FIG. 18 is a plan view of a transmission-type light-source assembly of an image reading device according to Embodiment 7. In FIG. 18, numeral 45 denotes a transmission-type light-source assembly in which the range of the irradiation angle is made to be narrow by providing slits in the vicinity of the optical-axis center of the transmission-type light guide; numeral 46 denotes a slit portion for the downward irradiation; numeral 47 denotes slit portions for the oblique irradiation; and numeral 48 denotes a case for the transmission-type light-source assembly.

As represented in FIG. 18, by providing the slit portions, in the irradiation region of the transmission-type light-source assembly 45, corresponding to the irradiation angles different from each other, that is, by arranging the slit portion 46 for the downward irradiation and the slit portions 47 for the oblique irradiation, as hollow regions in the case 48, only the irradiation-angular center region of the light exited from the reflective faces and the tilted faces is irradiated in a spot manner, whereby a high-resolution image can also be read out while maintaining its sharpness.

Embodiment 8

Figure 19:
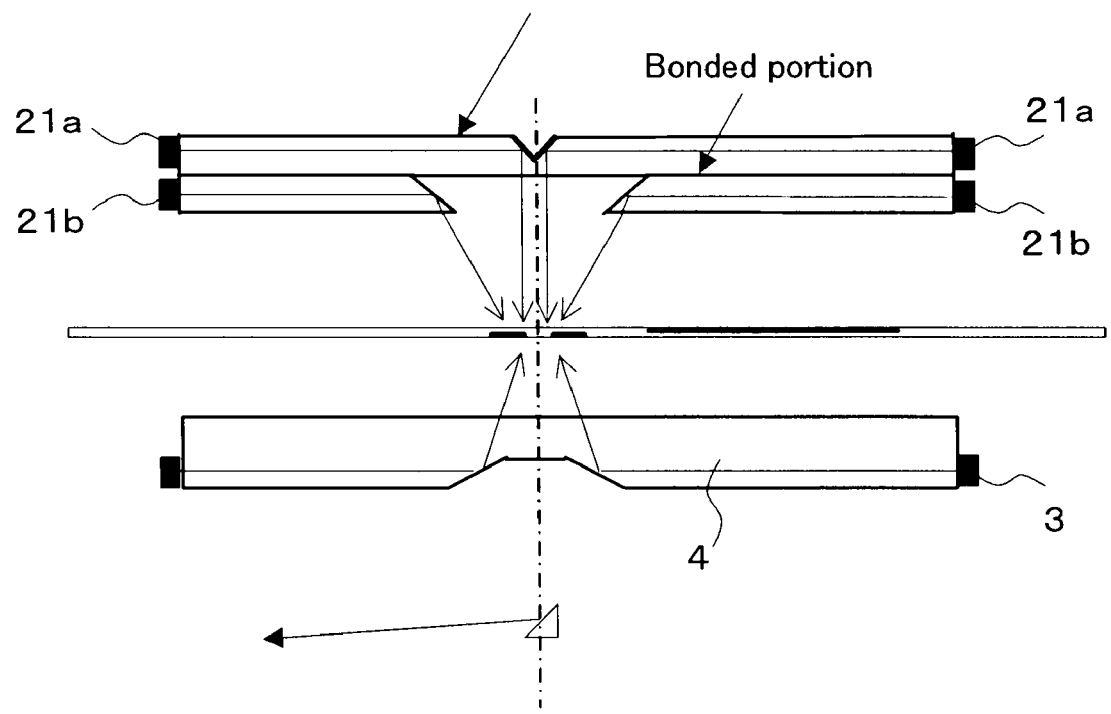
FIG. 19 is a schematic cross-sectional view illustrating an illumination optical system, including transmission-type light sources, of an image reading device according to Embodiment 8 of the present invention.

Although, in each of Embodiments 1-7, the light guide has been structured and integrated so that the cut-off portion is provided in the vicinity of the light exit portion of the light guide by forming process or the like, as represented in FIG. 19, by structuring a transmission-type light guide separated in parallel to the sub-scanning direction, and by coating or vacuum depositing reflective material on the neighboring bonded portion to form an exclusive total-reflection path, leakage of unnecessary light into the neighboring total-reflection path can be prevented, and setting of a high-efficiency light-exposure ratio can be realized. Similarly, by coating or vacuum depositing light-absorption material on the neighboring bonded portion for light-shielding, leakage of unnecessary light into the neighboring total-reflection path can be prevented, and setting of the exposure ratio also becomes easy.

Embodiment 9

Figure 20:
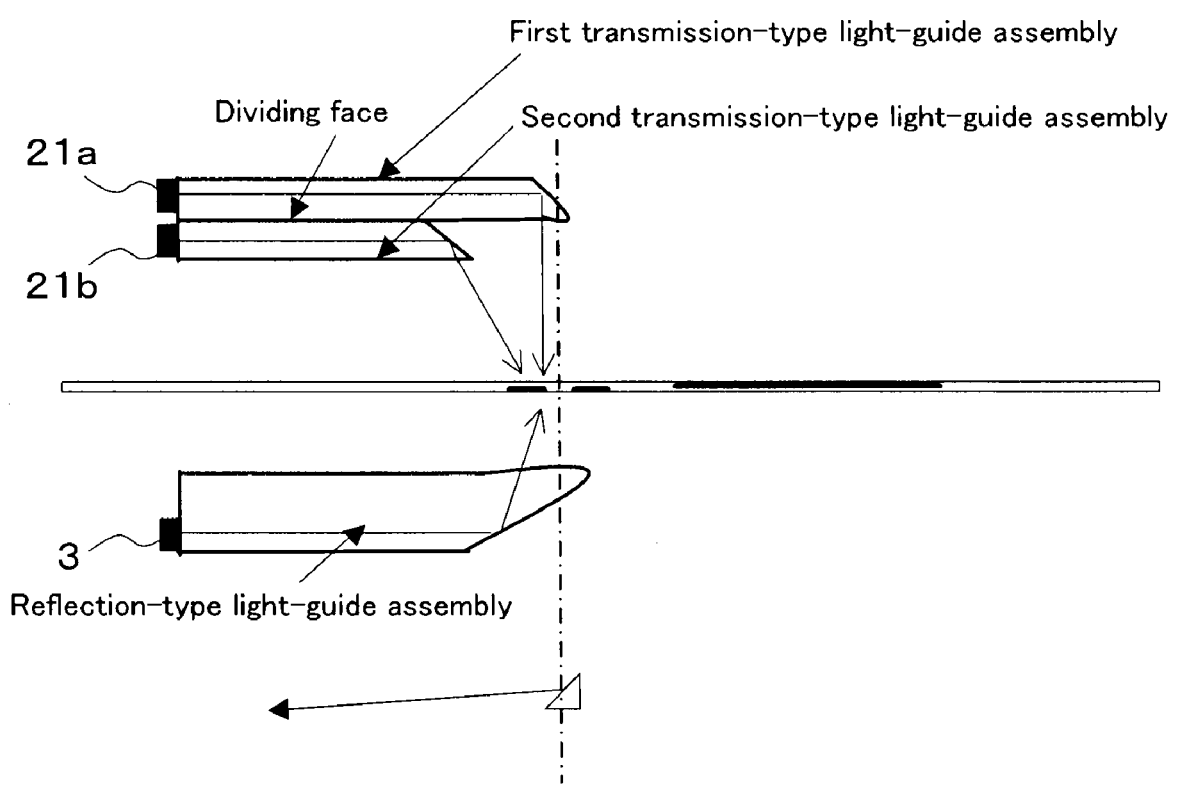
FIG. 20 is a schematic cross-sectional view illustrating an illumination optical system, including transmission-type light sources, of an image reading device according to Embodiment 9 of the present invention.

Although, in each of Embodiments 1-8, light has been emitted from both ends of the light guide, as represented in FIG. 20, in a case of a conveying means being used by which troubles are hardly caused by crinkles or flotage of the document 1, or in a use where high-speed reading is not needed, light is not necessarily emitted from both ends of the light guide, in which a comparable effect can be resultantly obtained even when the light is emitted only from one end thereof Embodiment 10

Figure 21:
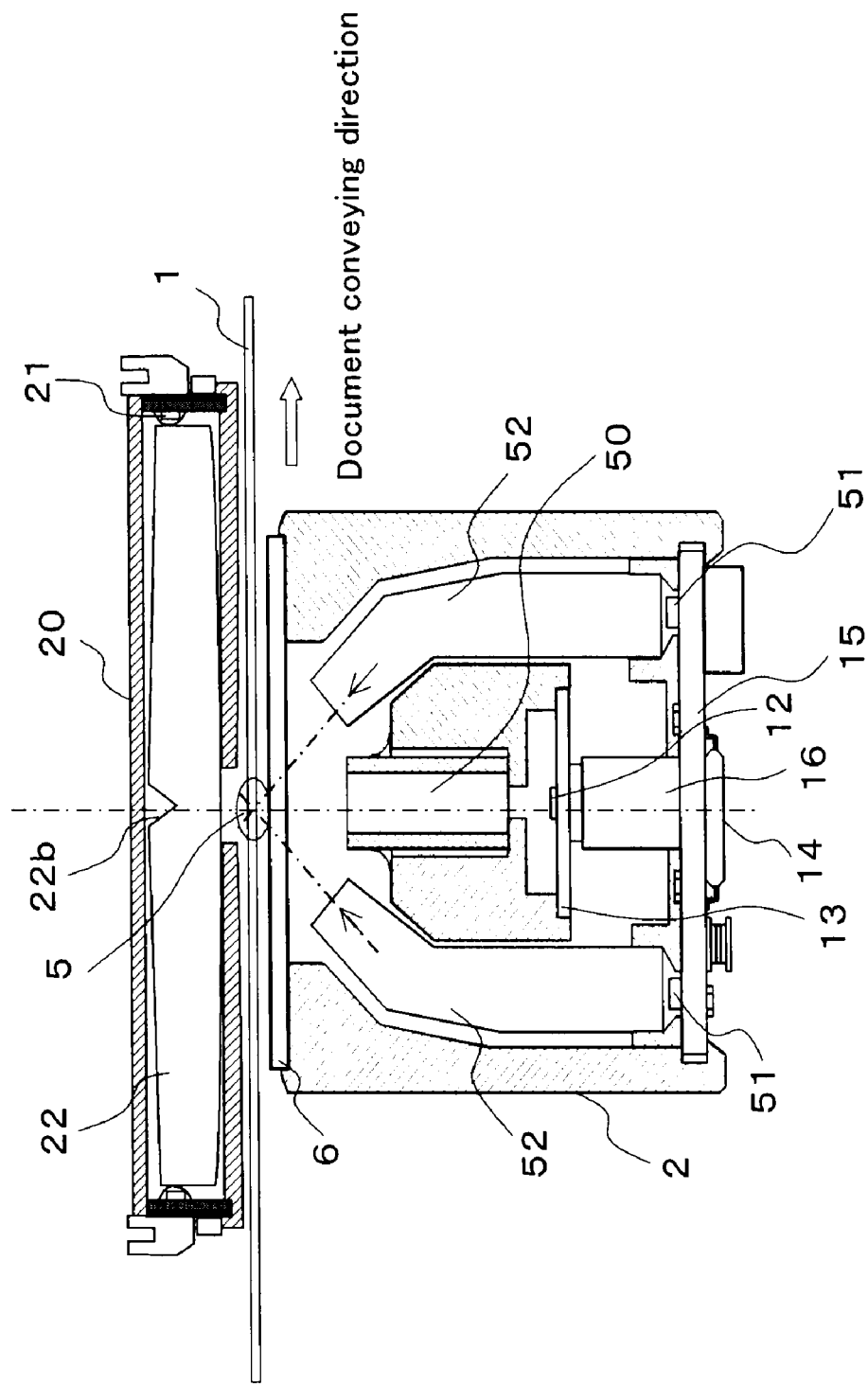
FIG. 21 is a cross-sectional configuration view illustrating an image reading device according to Embodiment 10 of the present invention.

Although, in each of Embodiments 1-9, the telecentric imaging optical system using the imaging means (lens assembly) configured with the mirror system and the lens system has been explained, in Embodiment 10, a case in which a widely-used imaging optical system is used is explained. FIG. 21 is a cross-sectional configuration view of an image reading device according to Embodiment 10 of the present invention. In FIG. 21, numeral 50 denotes a lens assembly such as a rod lens array for focusing light exited from the light-irradiation portion 5; numeral 51 denotes reflection-type light sources; and numeral 52 denotes reflection-type light guides. In this figure, the same numerals as those in FIG. 1 represent the same or corresponding portions.

Next, an operation is explained. In FIG. 21, light emitted from the transmission-type light sources 21 arranged in a main-scanning direction propagates in sub-scanning directions through the inside of the transmission-type light guide 22, and the light, after reflected by the reflective portion 22b, is incident on the document 1 positioned in the light-irradiation portion 5. Transmission light passing through the document 1 is focused by the rod lens array 50, and the light focused by the rod lens array 50 is received by the sensor ICs 12. Analog signals photoelectric-converted by the sensor ICs 12 are signal-processed by the signal-processing boards 15 through the sensor boards 13. The rest of the functions conform to those in Embodiment 1.

In Embodiment 10, because the light receiving faces for light incident on the sensor ICs 12 are linearly arranged in a row, a single sensor board 13 and a single signal-processing board 15 are enough for the sensor ICs.

As described above, according to the image reading device in Embodiment 10, after light emitted from the transmission-type light sources 21 has been propagated in the sub-scanning direction through the inside of the transmission-type light guide 22, and exited to the document 1 from the reflective portion 22b of the transmission-type light sources 21, optical information exited from the document 1 is focused by the rod lens array 50, so that this system can also be applied to a common-type contact image sensor (CIS) using a fiber lens, etc.

Embodiment 11

Figure 22:
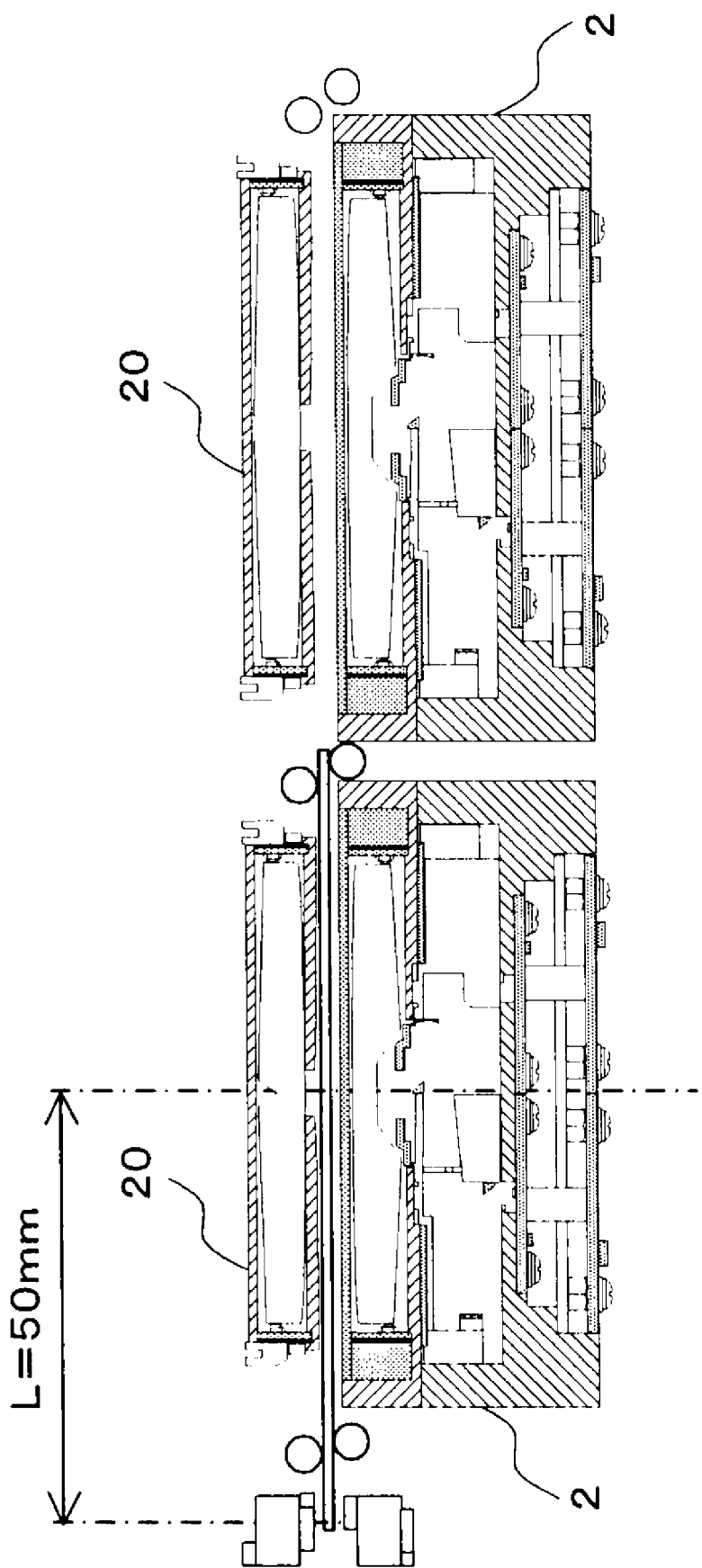
FIG. 22 is a cross-sectional configuration view explaining a method of placing image reading devices according to Embodiment 11 of the present invention.

Although, in each of Embodiments 1-10, one set of the CIS 2 by which light can be irradiated at different irradiation angles has been arranged along the conveying path of the document 1, as represented in FIG. 22, a plurality of CISs may be arranged in parallel to each other along the conveying path of the document 1. Thereby, by detecting each of irradiation light components from their light sources whose wavelengths are different from each other, identification or true/false determination of images corresponding to respective characteristics of targets to be light-irradiated can be further high-accurately performed. Moreover, the CISs 2 may be arranged in parallel to each other for reading both faces of the document 1.

What is claimed is:

1. An image reading device comprising:
a conveying means for conveying in a conveying direction a target to be light-irradiated including a transparent portion;
a lens assembly, positioned on one side of the target, for focusing transmission light having passed through the transparent portion of the target;
a sensor for receiving the transmission light focused by the lens assembly;
a light guide, positioned on the other side of the target, extending in a main-scanning direction and a sub-scanning direction;
an array light source, provided at an end portion of the light guide, in which light sources are arranged in an array along the main-scanning direction, for emitting light in the sub-scanning direction into the light guide; and
a reflective portion, formed at a position where optical axes of the array light source intersect with the light guide, for reflecting light emitted from the array light source in the sub-scanning direction to a light irradiated portion where the target is irradiated with light, wherein the reflective portion tilts the light emitted from the array light source with respect to the optical axis of an imaging optical system as the lens assembly so as to irradiate the target.

2. An image reading device as recited in claim 1, wherein reflective material is provided on the surface of the reflective portion.

3. An image reading device comprising:
a conveying means for conveying in a conveying direction a target to be light-irradiated including a transparent portion;
a lens assembly, positioned on one side of the target, for focusing transmission light having passed through the transparent portion of the target;
a sensor for receiving the transmission light focused by the lens assembly;
light guide, positioned on the other side of the target, extending in a main-scanning direction and a sub-scanning direction;
a first light source, provided at an end portion of the light guide, in which light sources are arranged in an array along the main-scanning direction, for emitting light having a plurality of wavelengths in the sub-scanning direction into the light guide;
a second light source, provided at an end portion of the light guide, in which light sources are arranged in an array in the main-scanning direction along the arrangement of the first light source, for emitting light having a plurality of wavelengths in the sub-scanning direction into the light guide;
a first reflective portion, formed at a position where optical axes of the first light source intersect with the light guide, for reflecting light emitted from the first light source in the sub-scanning direction to a light irradiated portion where the target is irradiated with light;
a second reflective portion, having a slant angle different from that of the first reflective portion, formed at a position where optical axes of the second light source intersect with the light guide, for reflecting light emitted from the second light source in the sub-scanning direction to the light irradiated portion where the target is irradiated with light; and
lighting control means for controlling in a time-division manner an exposure ratio between light quantities incident on the first and the second reflective portions,
the light-irradiated portion being irradiated with light from the first and the second reflective portions by their irradiation angles different from each other, and
the sensor detecting electrical signals time-divided by the lighting control means.

4. An image reading device as recited in claim 3, wherein the first reflective portion or the second reflective portion tilts light guided in the sub-scanning direction with respect to the optical axis of the lens assembly as an imaging optical system so as to irradiate the target.

5. An image reading device as recited in claim 4, wherein reflective material is provided on a part of the surfaces of the first reflective portion or the second reflective portion.

6. An image reading device as recited in claim 3, wherein reflective material is provided on a part of the surfaces of the first reflective portion or the second reflective portion.

7. An image reading device comprising:
a conveying means for conveying in a conveying direction a target to be light-irradiated including a transparent portion;

a light guide, positioned on one side of the target, extending in a main-scanning direction and a sub-scanning direction;

a first light source, provided at an end portion of the light guide in a front side of the conveying direction, in which light sources are arranged in an array along the main-scanning direction, for emitting light having a plurality of wavelengths in the sub-scanning direction into the light guide;

a second light source, provided at an end portion of the light guide in the front side of the conveying direction, in which light sources are arranged in an array in the main-scanning direction along the arrangement of the first light source, for emitting light having a plurality of wavelengths in the sub-scanning direction into the light guide;

a first reflective portion, formed at a position where optical axes of the first light source intersect with the light guide, for reflecting light emitted from the first light source in the sub-scanning direction to a light irradiated portion where the target is irradiated with light;

a second reflective portion, having a slant angle different from that of the first reflective portion, formed at a position where optical axes of the second light source intersect with the light guide, for reflecting light emitted from the second light source in the sub-scanning direction to the light irradiated portion where the target is irradiated with light;

a third light source, provided at an end portion of the light guide in a rear side of the conveying direction, in which light sources are arranged in an array along the main-scanning direction, for emitting light having a plurality of wavelengths in the sub-scanning direction into the light guide;

a fourth light source, provided at an end portion of the light guide in the rear side of the conveying direction, in which light sources are arranged in an array in the main-scanning direction along the arrangement of the third light source, for emitting light having a plurality of wavelengths in the sub-scanning direction into the light guide;

a third reflective portion, formed at a position where optical axes of the third light source intersect with the light guide, for reflecting light emitted from the third light source in the sub-scanning direction to the light irradiated portion where the target is irradiated with light;

a fourth reflective portion, having a slant angle different from that of the third reflective portion, formed at a position where optical axes of the fourth light source intersect with the light guide, for reflecting light emitted from the fourth light source in the sub- scanning direction to the light irradiated portion where the target is irradiated with light;

lighting control means for controlling in a time-division manner exposure ratios among light quantities incident on the first, second, third and fourth reflective portions;

a lens assembly, positioned on the other side of the target, for focusing transmission light having passed through the transparent portion of the target; and a sensor for receiving, for each divided time, the transmission light focused by the lens assembly, the light-irradiated portion being irradiated with light from the first reflective portion and the second reflective portion by their irradiation angles different from each other, and the light-irradiated portion being irradiated with light from the third reflective portion and the fourth reflective portion by their irradiation angles different from each other.

8. An image reading device as recited in claim 7, wherein the first reflective portion or the second reflective tilts the light emitted from the first or the second light source with respect to the optical axis of the lens assembly as an imaging optical system so as to irradiate the target.

9. An image reading device as recited in claim 8, wherein reflective material is provided on a part of the surfaces of the first reflective portion or the second reflective portion.

10. An image reading device as recited in claim 7, wherein reflective material is provided on a part of the surfaces of the first reflective portion or the second reflective portion.

11. An image reading device comprising:

a conveying means for conveying in a conveying direction a target to be light-irradiated including a transparent portion;

a light guide, positioned on one side of the target, extending in a main-scanning direction and a sub-scanning direction;

a first light source, provided at an end portion of the light guide, in which light sources are arranged in an array along the main-scanning direction, for emitting light having a plurality of wavelengths in the sub-scanning direction into the light guide;

a second light source, provided at an end portion of the light guide, in which light sources are arranged in an array in the main-scanning direction along the arrangement of the first light source, for emitting light having a plurality of wavelengths in the sub-scanning direction into the light guide;

a first reflective portion, formed at a position where optical axes of the first light source intersect with the light guide, for reflecting light emitted from the first light source in the sub-scanning direction to a light irradiated portion where the target is irradiated with light;

a second reflective portion, having a slant angle different from that of the first reflective portion, formed at a position where optical axes of the second light source intersect with the light guide, for reflecting light emitted from the second light source in the sub-scanning direction to the light irradiated portion where the target is irradiated with light;

lighting control means for selecting and controlling an exposure ratio of light incident on the first reflective portion and the second reflective portion;

a lens assembly, positioned on the other side of the target, for focusing transmission light having passed through the transparent portion of the target; and a sensor for receiving the transmission light focused by the lens assembly, electrical signals generated from the transmission light irradiated to the light irradiated-portion via the first reflective portion and the second reflective portion at different light-irradiation angles, being switched and detected.

12. An image reading device comprising:

conveying means for conveying in a conveying direction a banknote including a watermark portion;

a light guide, positioned on one side of the banknote, extending in a main-scanning direction and a sub-scanning direction;

a first light source, provided at an end portion of the light guide, in which light sources are arranged in an array along the main-scanning direction, for emitting light having a plurality of wavelengths in the sub-scanning direction into the light guide;

a second light source, provided at an end portion of the light guide, in which light sources are arranged in an array in the main-scanning direction along the arrangement of the first light source, for emitting light having a plurality of wavelengths in the sub-scanning direction into the light guide;

a first reflective portion, formed at a position where optical axes of the first light source intersect with the light guide, for reflecting light emitted from the first light source in the sub-scanning direction to a light irradiated portion where the banknote is irradiated with light;

a second reflective portion, having a slant angle different from that of the first reflective portion, formed at a position where optical axes of the second light source intersect with the light guide, for reflecting light emitted from the second light source in the sub-scanning direction to the light irradiated portion where the banknote is irradiated with light;

lighting control means for controlling in a time-division manner an exposure ratio between light quantities incident on the first reflective portion and the second reflective portion; and a sensor, positioned on the other side of the banknote, for receiving, for each divided time, transmission light having passed through the watermark portion, electrical signals generated from the transmission light irradiated to the light irradiated-portion via the first reflective portion and the second reflective portion at different light-irradiation angles, being respectively detected, so that the banknote is determined to be real or counterfeit.

13. An image reading device comprising:

a conveying means for conveying in a conveying direction a target to be light-irradiated including a transparent hologram region;

a light guide, positioned on one side of the target, extending in a main-scanning direction and a sub-scanning direction;

a first light source, provided at an end portion of the light guide, in which light sources are arranged in an array along the main-scanning direction, for emitting light having a plurality of wavelengths in the sub-scanning direction into the light guide;

a second light source, provided at an end portion of the light guide, in which light sources are arranged in an array in the main-scanning direction along the arrangement of the first light source, for emitting light having a plurality of wavelengths in the sub-scanning direction into the light guide;

a first reflective portion, formed at a position where optical axes of the first light source intersect with the light guide, for reflecting light emitted from the first light source in the sub-scanning direction to a portion, of the hologram region, to be irradiated with light;

a second reflective portion, having a slant angle different from that of the first reflective portion, formed at a position where optical axes of the second light source intersect with the light guide, for reflecting light emitted from the second light source in the sub- scanning direction to the light irradiated portion where the target is irradiated with light;

lighting control means for controlling in a time-division manner an exposure ratio between light quantities incident on the first reflective portion and the second reflective portion; and a sensor, positioned on the other side of the target, for receiving, for each divided time, transmission light having passed through the hologram region, electrical signals generated from the transmission light irradiated to the light irradiated-portion via the first reflective portion and the second reflective portion at different light-irradiation angles, being detected.

* * * * *